United States Patent
Leung et al.

(12) 
(10) Patent No.: US 6,338,134 B1
(45) Date of Patent: Jan. 8, 2002

(54) METHOD AND SYSTEM IN A SUPERSCALAR DATA PROCESSING SYSTEM FOR THE EFFICIENT PROCESSING OF AN INSTRUCTION BY MOVING ONLY POINTERS TO DATA

(75) Inventors: Wan Lin Leung; Frank Cassatt Harwood, both of Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/222,056

(22) Filed: Dec. 29, 1998

(51) Int. Cl.$^7$ ................................................. G06F 9/30
(52) U.S. Cl. ....................................................... 712/217
(58) Field of Search ................................ 712/217, 222, 712/228

(56) References Cited

U.S. PATENT DOCUMENTS

| | | | |
|---|---|---|---|
| 5,644,746 A | 7/1997 | Holt et al. | 712/217 |
| 5,740,414 A | 4/1998 | Tovey et al. | 712/233 |
| 5,978,898 A | 11/1999 | Hathaway et al. | 712/208 |
| 5,978,900 A | 11/1999 | Liu et al. | 712/217 |
| 6,035,391 A | 3/2000 | Isaman | 712/226 |
| 6,112,296 A | 8/2000 | Witt et al. | 712/217 |

OTHER PUBLICATIONS

High–Performance Register–to–Register Transfer Instructions, IBM Technical Disclosure Bulletin, vol. 32, No. 11, Apr. 1990, pp. 368–369.

Resolving Store–Load Links in an Instruction Unit, IBM Technical Disclosure Bulletin, vol. 14, No. 3, Aug. 1971, pp. 868–869.

*Primary Examiner*—Richard L. Ellis
(74) *Attorney, Agent, or Firm*—Bracewell & Patterson, LLP

(57) ABSTRACT

A method and system in a superscalar data processing system are disclosed for the efficient processing of an instruction by moving only pointers to data. Multiple instructions in the superscalar data processing system are processed during a single clock cycle. A determination is made whether one of these instructions is a particular type of instruction which specifies data to be moved or copied from a logical origination location to a logical destination location during processing of the instruction. In response to a determination that the instruction is a particular type of instruction, a first pointer field is established associated with the instruction for associating a pointer stored in the first pointer field with the logical origination location. A second pointer field is also established associated with the instruction for associating a pointer stored in the second pointer field with the logical destination location. A first pointer is associated with the instruction and identifies a physical location wherein the data is stored. In response to the first pointer being stored in the first pointer field, the logical destination location is associated with the physical location. The instruction is processed by storing the first pointer in the second pointer field. The logical destination location becomes associated with the physical location, such that the data remains in its original physical location during processing of the instruction.

46 Claims, 15 Drawing Sheets

|   | Physical Registers | | | |
|---|---|---|---|---|
| 10 | data1 | data1 | data1 | data1 |
| 11 | value3 | value3 | value3 | value3 |
| 28 |  |  |  | data2 |
| 64 |  | sum | sum | sum |

*Fig. 4*

|   | General Registers | | | |
|---|---|---|---|---|
| 1 |  |  |  |  |
| 2 | 10 | 64 | 64 | 28 |
| 3 | 11 | 11 | 11 | 11 |
| 4 |  |  |  |  |
| 5 |  |  |  |  |
| 6 |  |  |  |  |
| 7 |  |  |  |  |
| 8 | 12 | 12 | 12 | 12 |
| 9 |  |  | temp | temp |
| 10 |  |  |  |  |

*Fig. 3*

```
Load    2, data1
AddReg  2, 3
Store   2, temp
Load    2, data2
```

| 102 | 104 | 106 | 108 | 110 | 112 | 114 | 116 | 118 | 120 | 122 | 124 | 126 |
|---|---|---|---|---|---|---|---|---|---|---|---|---|
| Op Code | Log. Reg. | Log. Stack or Base | Disp. | Virtual Stack Flag | Stack Reg. # | Phy. Reg. ID of Stack | Built Storage Add. | Allocate Field | Phy. Reg. Field A | Phy. Reg. Field B | Phy. Reg. Field C | Execute Unit Setup Field |

Fig. 6 — 130

| 132 | 134 | 136 | 138 | 140 | 142 | 144 | 146 | 148 |
|---|---|---|---|---|---|---|---|---|
| Op Code | Base 1 or Logical Stack Register | Disp. 1 | Base 2 or Logical Stack Register | Disp. 2 | Virtual Stack Flag | Stack Reg. Number | Phy. Reg. ID | Built Storage Address = Logical Stack + (Disp. 1 or Disp. 2) |

Stack Reg. Table — 160

| Stack Reg. # | PR |
|---|---|
| ⋮ | ⋮ |
| 25 | 28 |
| 30 | 10 |
|  |  |

164 (row with 25,28); 162 (row with 30,10); 170; 172

Fig. 7

Synonym Table — 180

| PR# | GR# | Stack Reg. # | V1 | V2 |
|---|---|---|---|---|
| 10 | 196 | 198 | 200 | 202 |
|  |  | 30 |  | 1 |
| 28 | 2 | 25 | 1 | 1 |
| 64 |  |  |  |  |
| 128 |  |  |  |  |

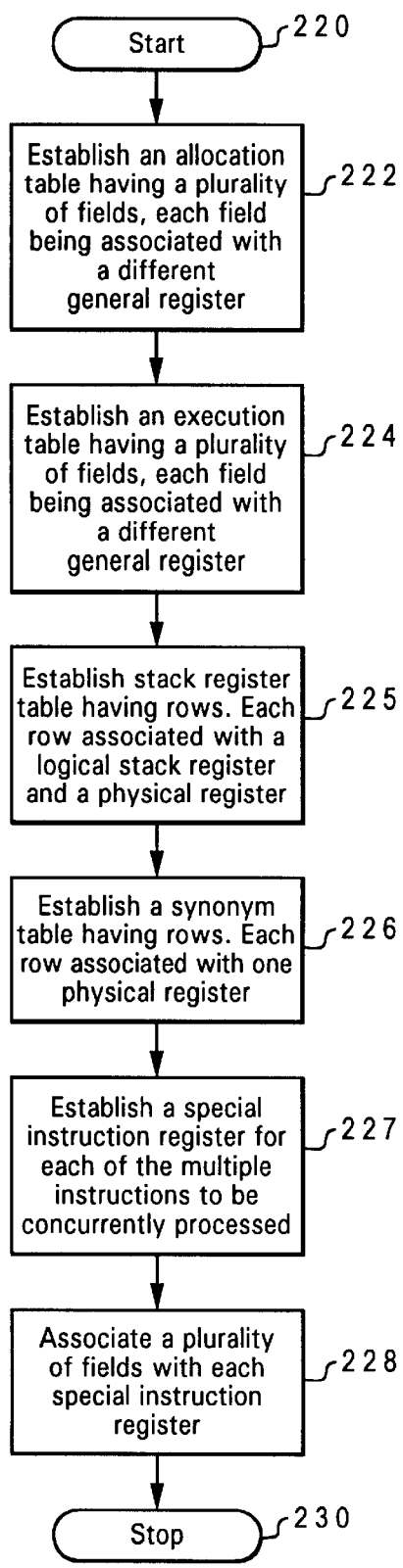
Fig. 9
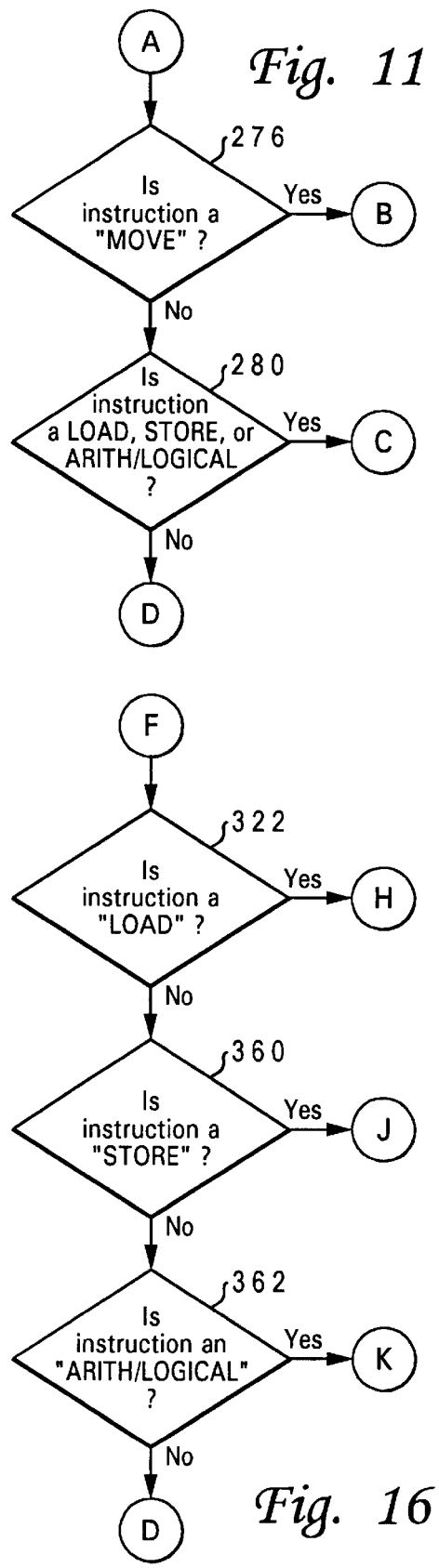
Fig. 11
Fig. 16

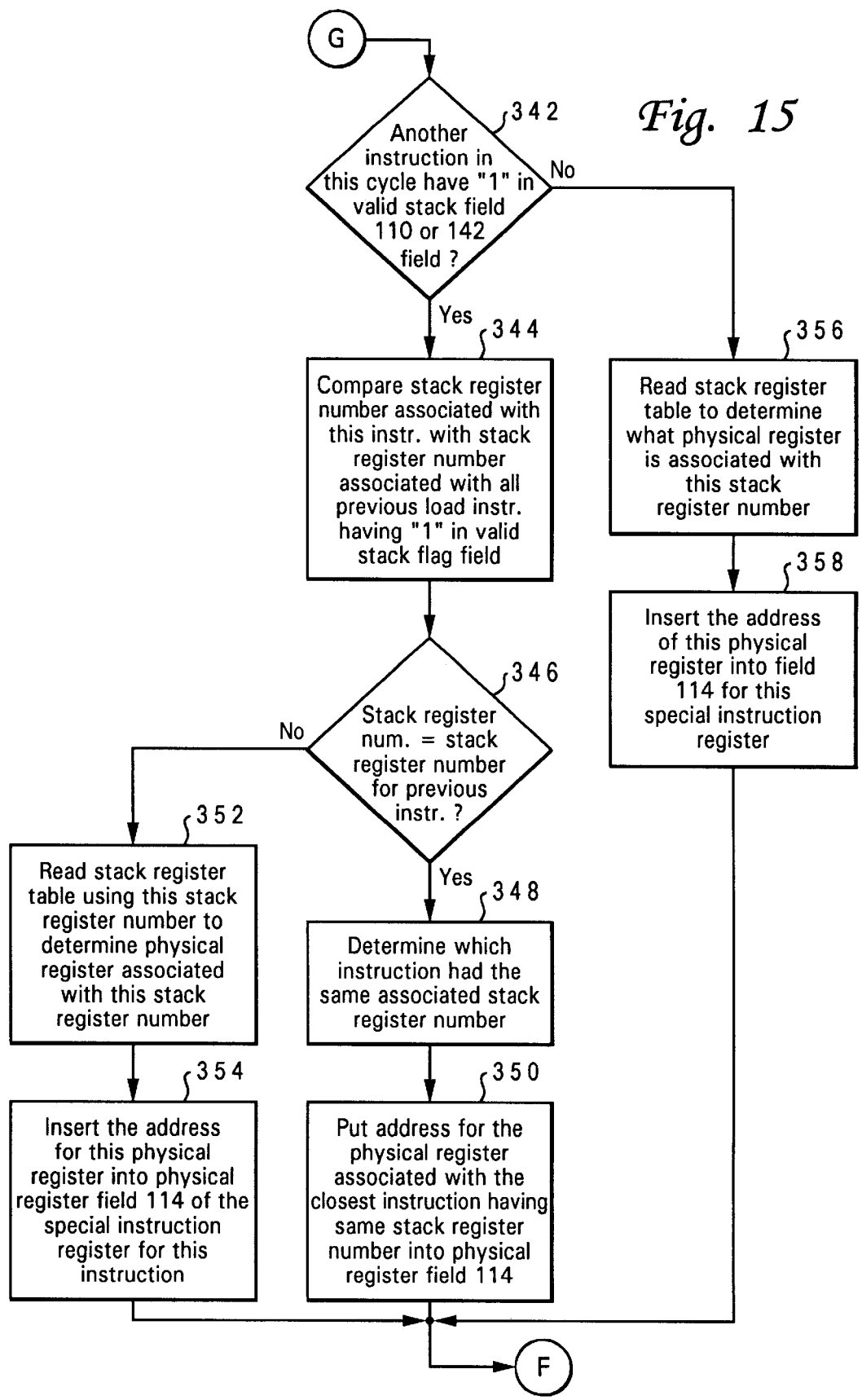

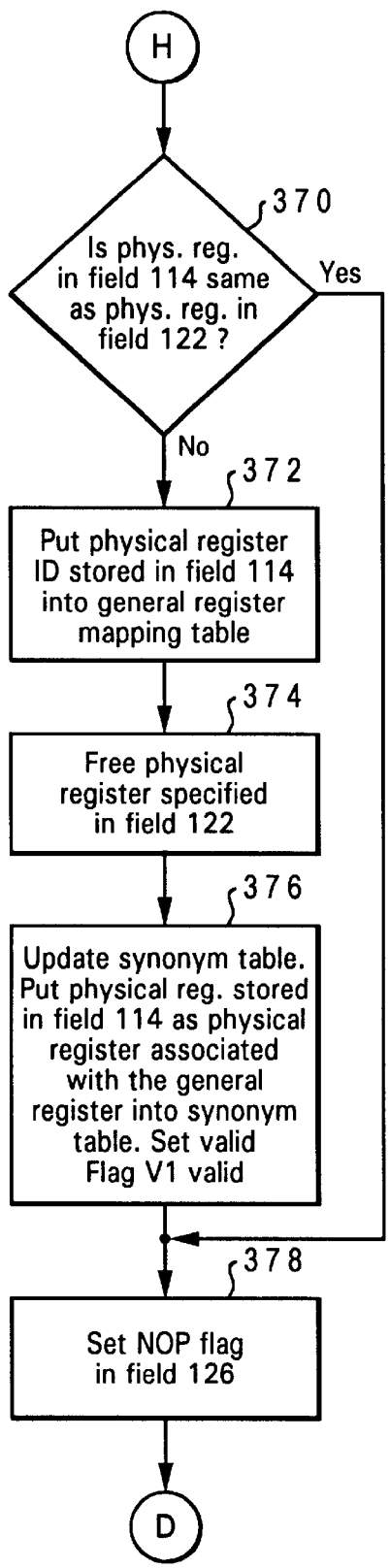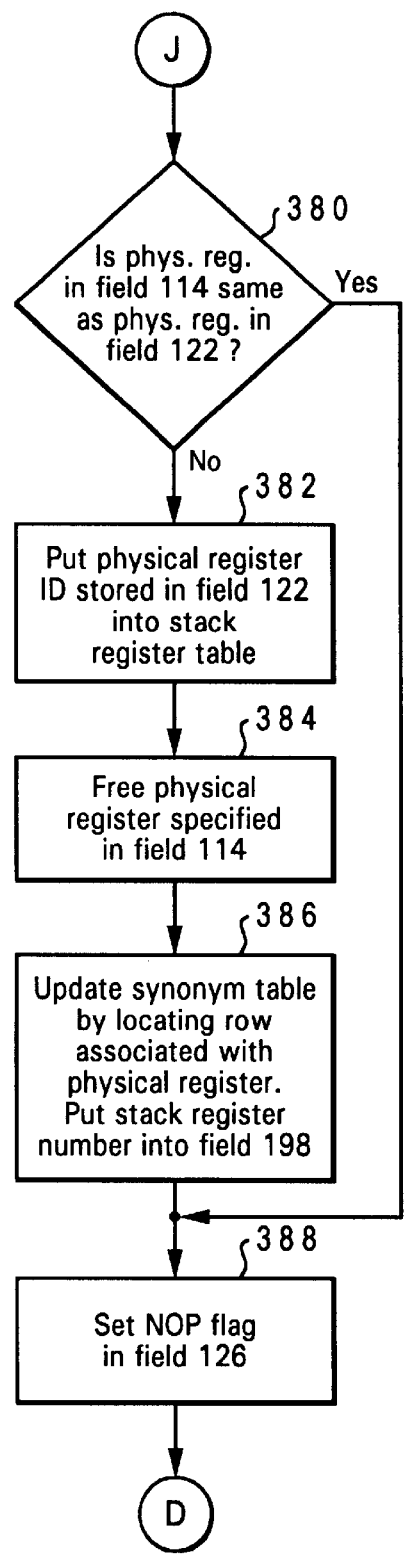
Fig. 17
Fig. 18

| 102 | 104 | 106 | 108 | 110 | 112 | 114 | 116 | 118 | 120 | 122 | 124 | 126 |
|---|---|---|---|---|---|---|---|---|---|---|---|---|
| Load | 2 | 8 | 1st Disp | 1 | 30 | 10 | Data1 | 1 | — | 40 | — | ~ |

Fig. 21

| Add | 2 | 3 | — | — | — | — | — | — | — | 40 | 11 | ~ |
|---|---|---|---|---|---|---|---|---|---|---|---|---|

Fig. 22

| Store | 2 | 9 | Disp | 1 | — | — | Temp | 0 | — | 40 | — | ~ |
|---|---|---|---|---|---|---|---|---|---|---|---|---|

Fig. 23

| Load | 2 | 8 | 2nd Disp | 1 | 25 | 28 | Data2 | 1 | — | 45 | — | ~ |
|---|---|---|---|---|---|---|---|---|---|---|---|---|

Fig. 24

| 102 | 104 | 106 | 108 | 110 | 112 | 114 | 116 | 118 | 120 | 122 | 124 | 126 |
|---|---|---|---|---|---|---|---|---|---|---|---|---|
| Load | 2 | 8 | 1st Disp | 1 | 30 | 10 | Data1 | 1 | – | 10 | – | ∿ |

Fig. 25

| Add | 2 | 3 | – | – | – | – | – | 1 | 64 | 10 | 11 | ∿ |
|---|---|---|---|---|---|---|---|---|---|---|---|---|

Fig. 26

| Store | 2 | 9 | Disp | 1 | – | – | Temp | 0 | – | 64 | – | ∿ |
|---|---|---|---|---|---|---|---|---|---|---|---|---|

Fig. 27

| Load | 2 | 8 | 2nd Disp | 1 | 25 | 28 | Data2 | 1 | – | 28 | – | ∿ |
|---|---|---|---|---|---|---|---|---|---|---|---|---|

Fig. 28

METHOD AND SYSTEM IN A SUPERSCALAR DATA PROCESSING SYSTEM FOR THE EFFICIENT PROCESSING OF AN INSTRUCTION BY MOVING ONLY POINTERS TO DATA

CROSS-REFERENCE TO RELATED APPLICATIONS

The present invention is related to the subject matter of co-pending patent applications Ser. No. 08/886,657 entitled "METHOD AND SYSTEM FOR THE TEMPORARY DESIGNATION OF ONE OF A PLURALITY OF PHYSICAL REGISTERS AS A GENERAL REGISTER", now U.S. Pat. No. 6,003,126, assigned to the assignee herein named filed on Jul. 1, 1997 and incorporated herein by reference, and Ser. No. 081946,840, entitled "METHOD AND SYSTEM FOR THE TEMPORARY DESIGNATION AND UTILIZATION OF A PLURALITY OF PHYSICAL REGISTERS AS A STACK", now U.S. Pat. No. 6,009,509, assigned to the assignee herein named filed on Oct. 8, 1997 and incorporated herein by reference.

BACKGROUND OF THE INVENTION

1. Technical Field

The present invention relates in general to data processing systems, and in particular to the efficient processing of one of multiple instructions to be processed during a single clock cycle in a superscalar data processing system by moving only pointers to data. Still more particularly, the present invention relates to a method and system in a superscalar data processing system for efficiently processing an instruction which specifies data to be moved from a logical origination location to a logical destination location by moving a pointer to the data into a field associated with the instruction and the destination location, wherein the data remains in its original location.

2. Description of the Related Art

A superscalar data processing system is a data processing system which includes a microprocessor architecture which is capable of executing multiple instructions per clock cycle. In order to execute multiple instructions per clock cycle, multiple independent functional units that can execute concurrently are required. Instructions are first fetched and then decoded. The overlap of the fetching and decoding of one instruction with the execution of a second instruction is called pipelining. In pipelined superscalar data processing systems, care must be taken to avoid dependencies where multiple instructions are fetched, decoded, and executed in a single cycle.

Software, written to load, store, and perform other operations, utilizes logical register names. These logical register names identify particular general registers. Typically, there are eight general registers which may be identified by software. In known systems, general purpose architectural registers, also called general registers, exist separate and apart from other registers which may also be included, such as special purpose registers, and rename registers. These general registers are initially associated with a particular logical register name.

For example, one of the general purpose registers may be designated as general register 2 and be associated with a logical register name of "2". A typical software instruction may attempt to load data into general register 2. This instruction may be written: LOAD 2, data1. When processing this instruction, a copy of the data stored in storage location data1 will be loaded into the general register designated as general register 2. In such systems, any time an instruction is associated with a logical register name of "2", it will utilize the general register designated as general register 2.

Each general register included in these systems is designated as a particular general register. Often there may be eight general registers in a system. In this case, the general registers may be designated as general register 1 through general register 8. These general register designations exist in hardware and are therefore determined prior to the system ever being powered on. These designations never change. A general register designated as general register 1 will always be designated as general register 1. Further, no other register can ever be designated as general register 1.

In superscalar data processing systems, one potential conflict may arise when multiple instructions are to be processed during a single clock cycle. A conflict may exist when two or more of these instructions attempt to utilize the same general register. For example, the following instruction sequence may need to be concurrently processed:

Instruction N1: LOAD 2, data1
Instruction N2: ADD REG 2,3
Instruction N3: STORE 2, temp
Instruction N4: LOAD 2, data2

A conflict arises during scheduling of these instructions because both instructions N1 and N4 load different data into general register 2. The instructions may be scheduled such that instruction N4 destroys the result from instruction N2 before instruction N3 had a chance to put the result into storage location "temp".

Instructions may move data between a storage location and a stack location. A stack is a designated dynamic area of memory, either main memory or a cache, that stores temporary logical register information and returns addresses of subroutines. The stack includes stack registers which are the multiple, contiguous storage locations into which data may be stored. The number of stack registers may expand or contract over time by having stack registers added to or removed from the stack. The stack is addressed by a stack pointer which is the address of the top of the stack. The top of the stack is the memory location which contains the data item most recently stored in the stack during a "PUSH" operation. Typically, a stack supports two types of operations, a PUSH and a POP. A PUSH operation adds a stack register to the top of the stack. A POP operation removes a stack register from the top of the stack.

A stack is a software programming model. When this model is mapped to hardware, it is implemented in main memory and temporarily resides in a cache. Although the programmer may treat stack registers in the stack as if they are registers, the stack registers are not actual physical registers. They are either main memory or cache locations. Therefore, accessing data stored in stack registers in a stack are subject to the performance problems associated with the accessing of memory.

Data may be moved from a main memory storage location into a stack register in a stack. The memory moved into the stack may then be moved into general registers. Logical or arithmetic operations may then be performed utilizing the data stored in the general registers. The results of these operations are then moved back to main memory. Therefore, in order to process an instruction which specifies data to be moved during the processing of the instruction into or out of a stack register, the data must be moved into and out of several memory locations, in the stack, general registers, and main memory or cache.

Therefore a need exists for a method and system in a superscalar data processing system for the efficient processing of an instruction by moving pointers to data such that the data is not copied and remains in its original physical location.

SUMMARY OF THE INVENTION

It is therefore one object of the present invention to provide an improved data processing system.

It is another object of the present invention to provide a method and system for the efficient processing of one of multiple instructions to be processed during a single clock cycle which specifies data to be moved during the processing of the instruction in a superscalar data processing system by moving only pointers to data.

It is yet another object of the present invention to provide a method and system in a superscalar data processing system for efficiently processing an instruction which specifies data to be moved from an origination location to a destination location by moving a pointer to the data into a field associated with the instruction and the destination location, wherein the data remains in its original location.

The foregoing objects are achieved as is now described. A method and system in a superscalar data processing system are disclosed for the efficient processing of an instruction by moving only pointers to data. Multiple instructions in the superscalar data processing system are processed during a single clock cycle. A determination is made whether one of these instructions is a particular type of instruction which specifies data to be moved from a logical origination location to a logical destination location during processing of the instruction. In response to a determination that the instruction is a particular type of instruction, a first pointer field is established associated with the instruction for associating a pointer stored in the first pointer field with the logical origination location. A second pointer field is also established associated with the instruction for associating a pointer stored in the second pointer field with the logical destination location. A first pointer is associated with the instruction and identifies a physical location wherein the data is stored. In response to the first pointer being stored in the first pointer field, the logical destination location is associated with the physical location. The instruction is processed by storing the first pointer in the second pointer field. The logical destination location becomes associated with the physical location, such that the data remains in its original physical location during processing of the instruction.

The above as well as additional objectives, features, and advantages of the illustrative embodiment will become apparent in the following detailed written description.

BRIEF DESCRIPTION OF THE DRAWINGS

The novel features are set forth in the appended claims. The present invention itself, however, as well as a preferred mode of use, further objectives and advantages thereof, will best be understood by reference to the following detailed description of the preferred embodiment when read in conjunction with the accompanying drawings, wherein:

FIG. 2 illustrates a pictorial representation of the contents of fetch control and decoder 18 in accordance with the method and system of the present invention;

FIG. 3 depicts a pictorial representation of a general register table 60, after each instruction shown in FIG. 2 is allocated during a second allocation phase, which is utilized to maintain a temporary designation of physical registers as general registers in accordance with the method and system of the present invention;

FIG. 4 illustrates a pictorial representation of contents of physical registers, after each instruction shown in FIG. 2 is allocated in the second phase, in accordance with the method and system of the present invention;

FIG. 5 depicts a pictorial representation of a first special instruction register 100 and its associated fields in accordance with the method and system of the present invention;

FIG. 6 illustrates a pictorial representation of a second special instruction register 130 and its associated fields in accordance with the method and system of the present invention;

FIG. 7 depicts a pictorial representation of a stack register table in accordance with the method and system of the present invention;

FIG. 8 illustrates a pictorial representation of a synonym table in accordance with the method and system of the present invention;

FIG. 9 is a high level flow chart depicting the establishment of tables and registers in accordance with the method and system of the present invention;

FIGS. 10–19 together are a high level flow chart illustrating the processing of an instruction in accordance with the method and system of the present invention;

FIG. 21 is a pictorial representation of a special instruction register storing a LOAD instruction 42 after the instruction has completed the first allocation phase;

FIG. 22 is a pictorial representation of a special instruction register storing an ADD instruction 44 after the instruction has completed the first allocation phase;

FIG. 23 is a pictorial representation of a special instruction register storing a STORE instruction 46 after the instruction has completed the first allocation phase;

FIG. 24 is a pictorial representation of a special instruction register storing a LOAD instruction 48 after the instruction has completed the first allocation phase;

FIG. 25 illustrates the contents of a special instruction register associated with a LOAD instruction 42 after the instruction has completed the second allocation phase;

FIG. 26 illustrates the contents of a special instruction register associated with a ADD instruction 44 after the instruction has completed the second allocation phase;

FIG. 27 illustrates the contents of a special instruction register associated with a STORE instruction 46 after the instruction has completed the second allocation phase; and FIG. 28 illustrates the contents of a special instruction register associated with a LOAD instruction 48 after the instruction has completed the second allocation phase.

DETAILED DESCRIPTION OF PREFERRED EMBODIMENT

Figure 1:
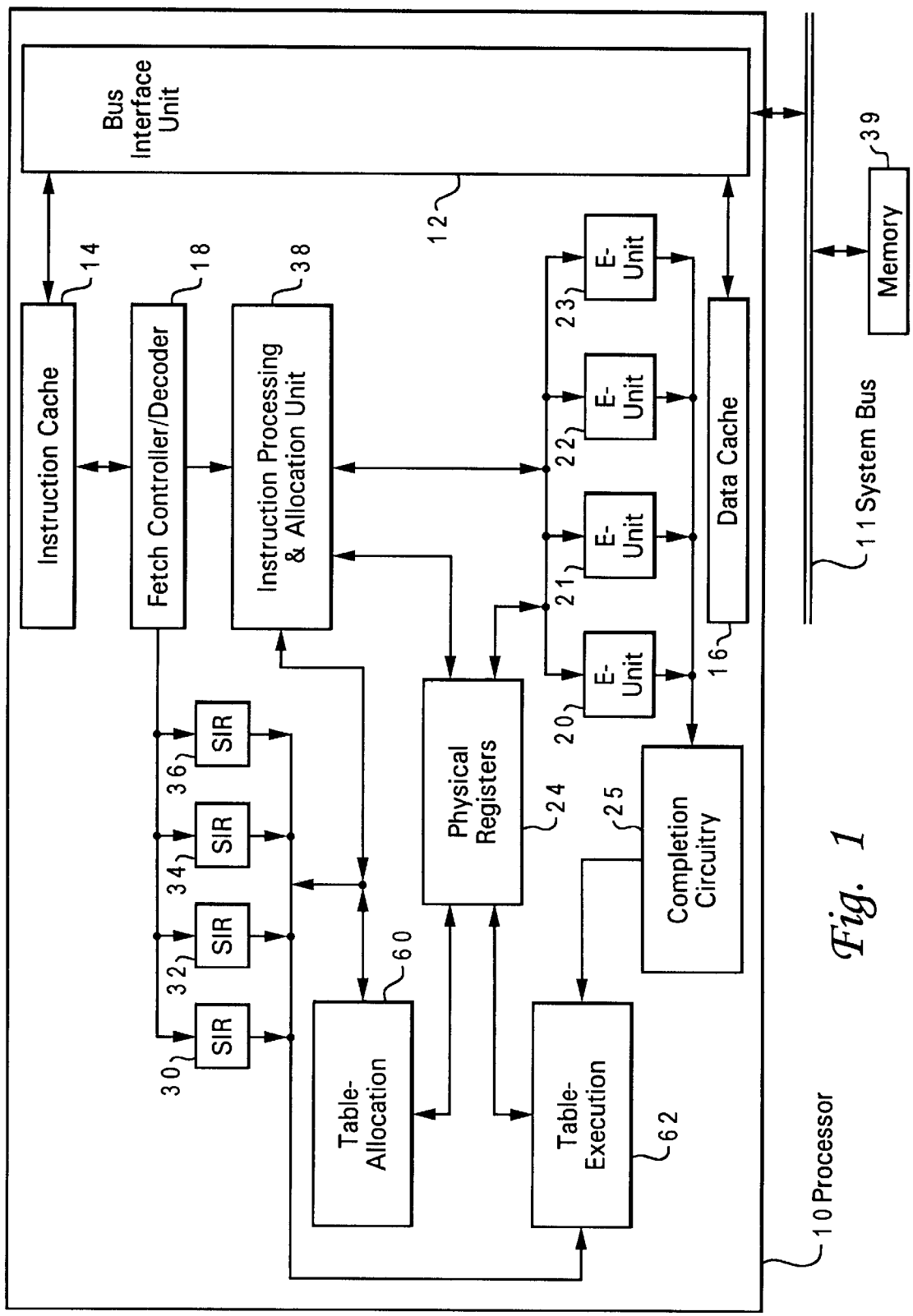
FIG. 1 depicts a high level block diagram of a data processing system 10 which may be utilized to implement the method and system of the present invention.
Figure 10:
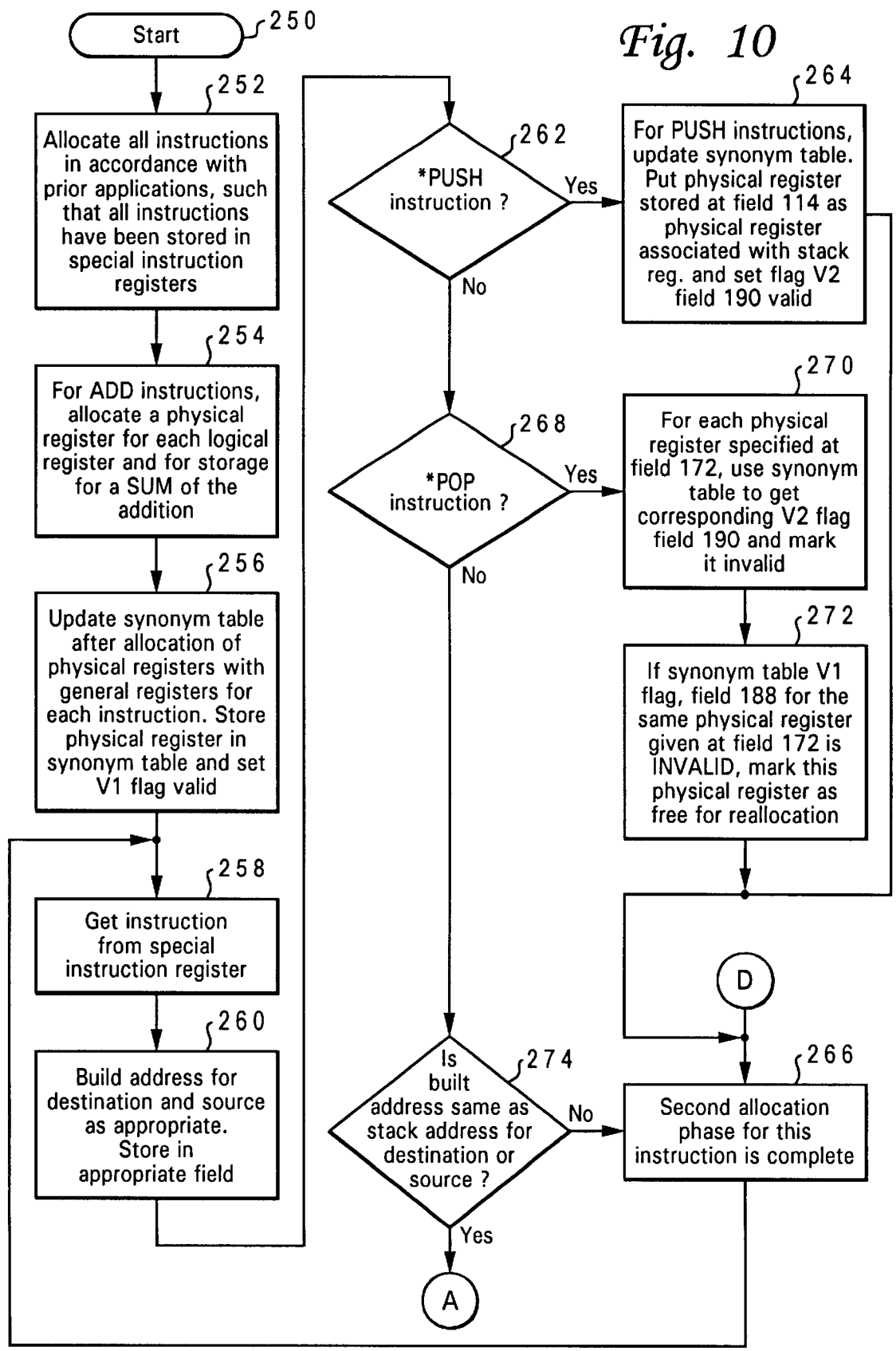
Figure 12:
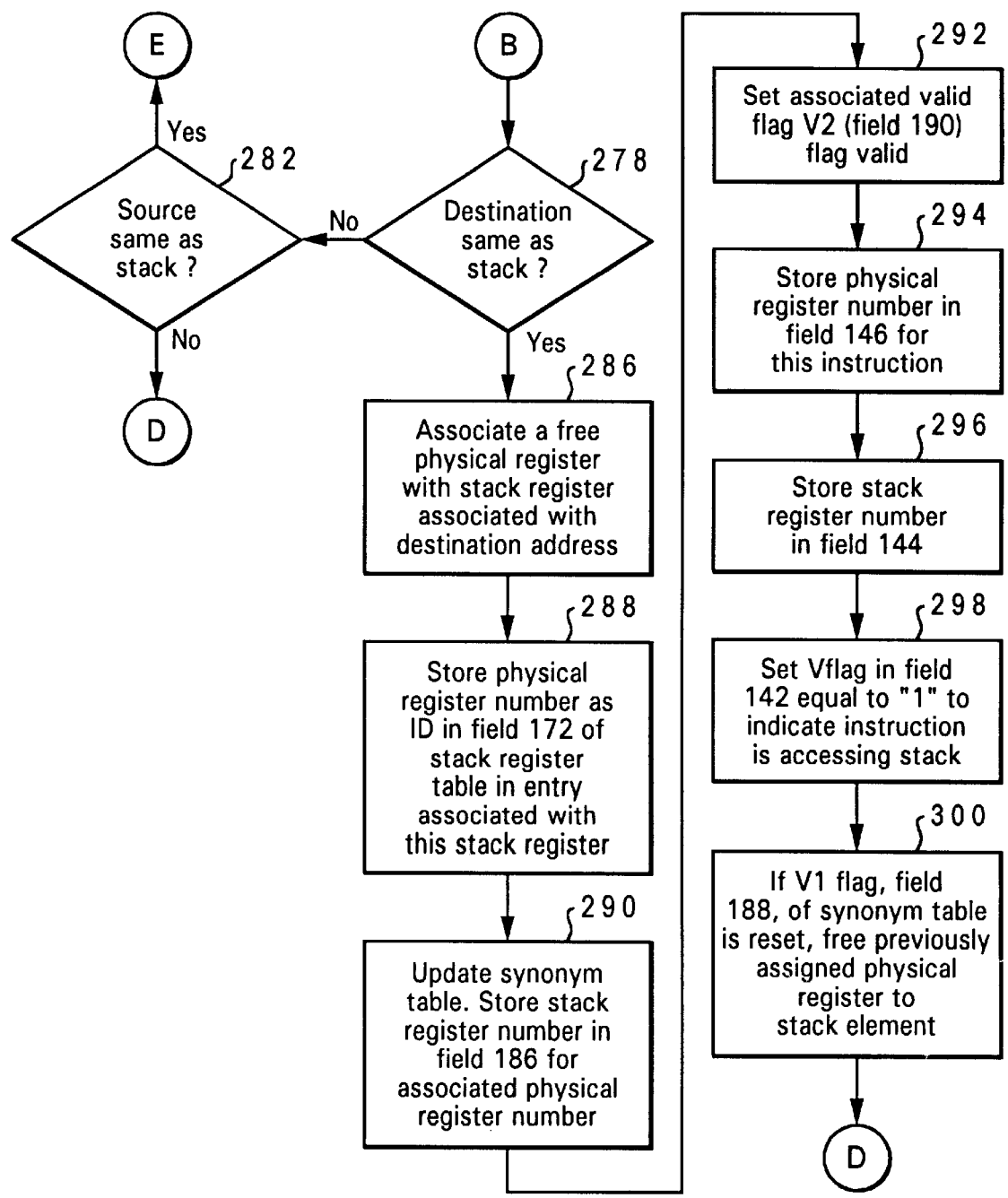
Figure 13:
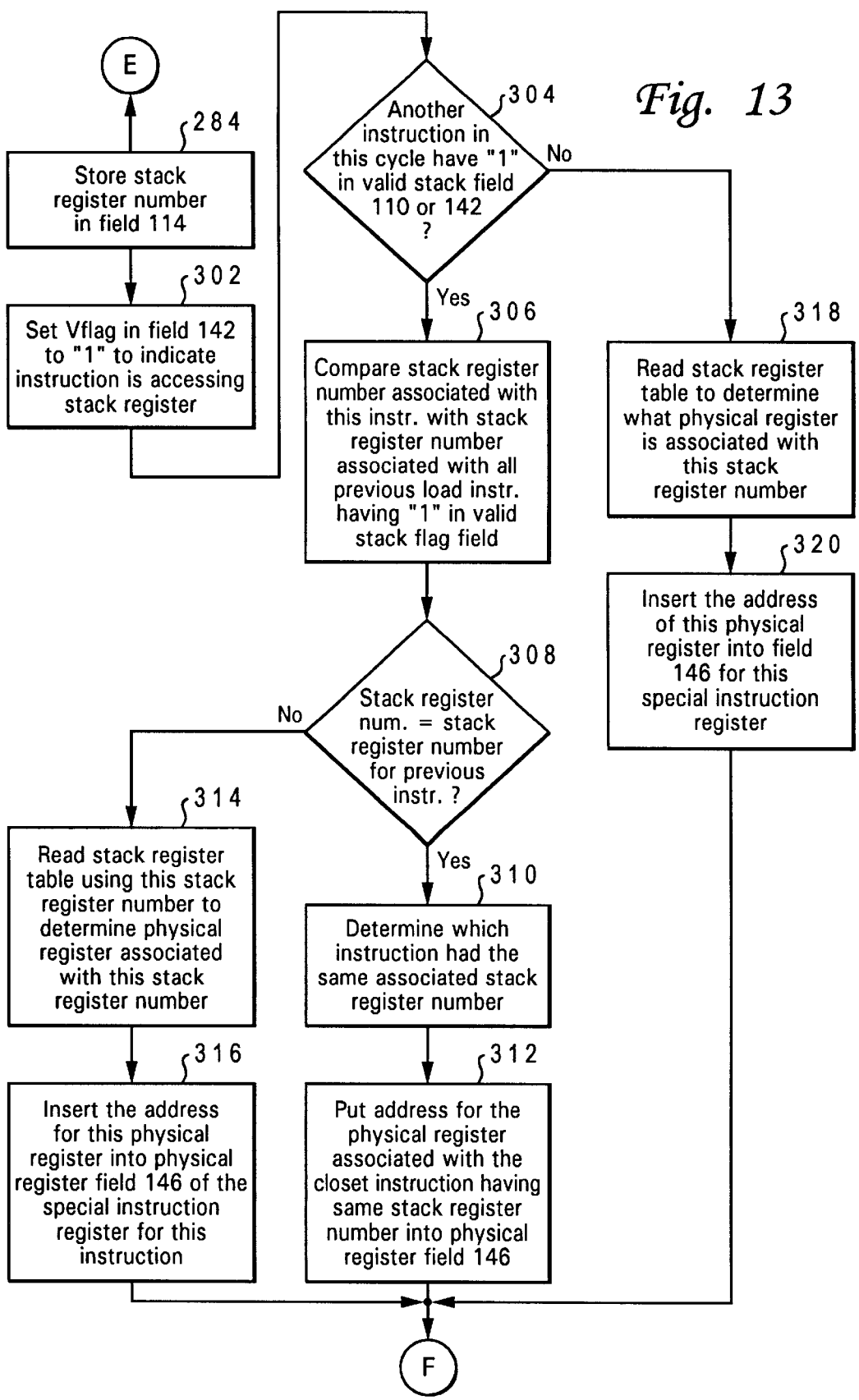
Figure 14:
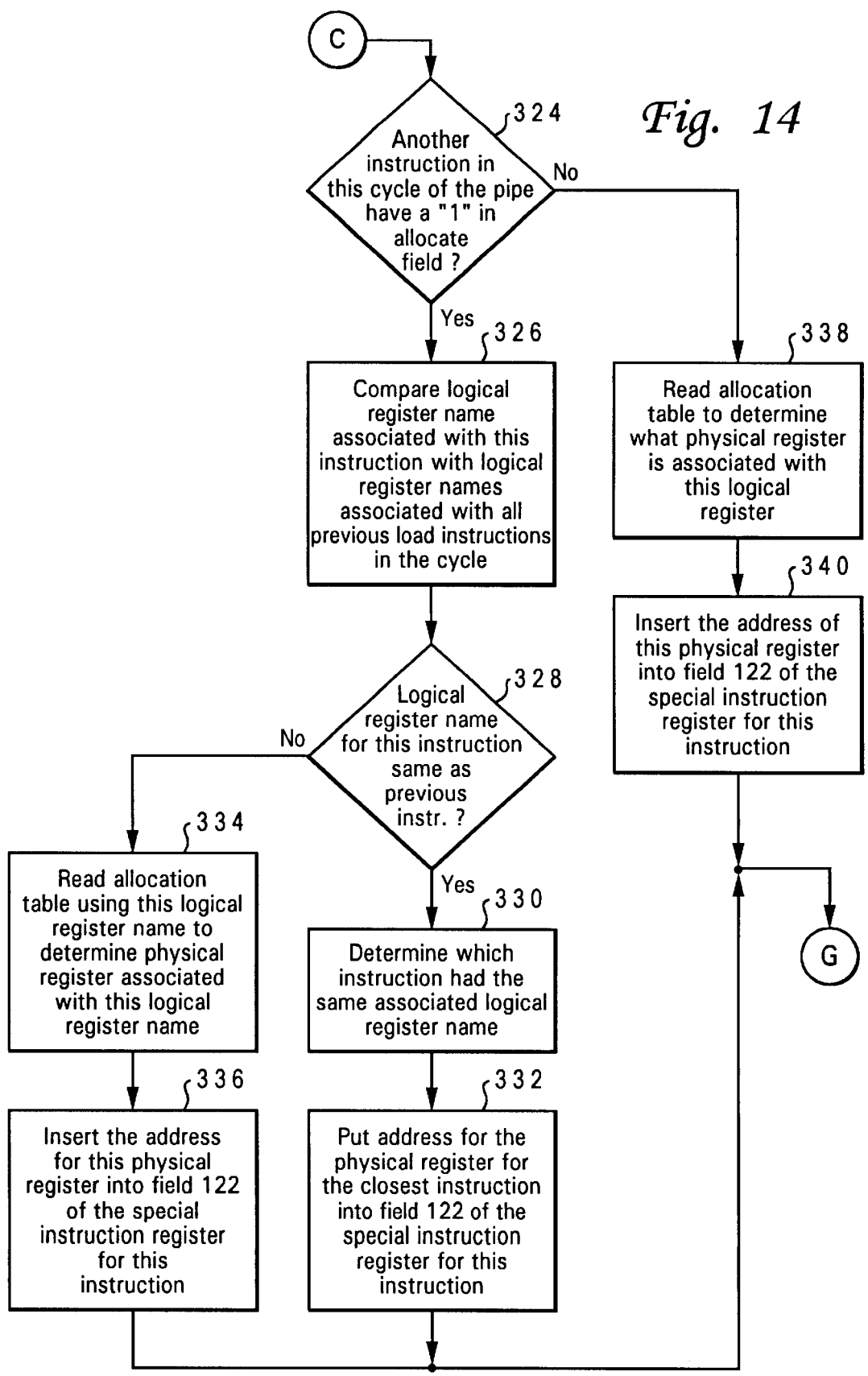
Figure 19:
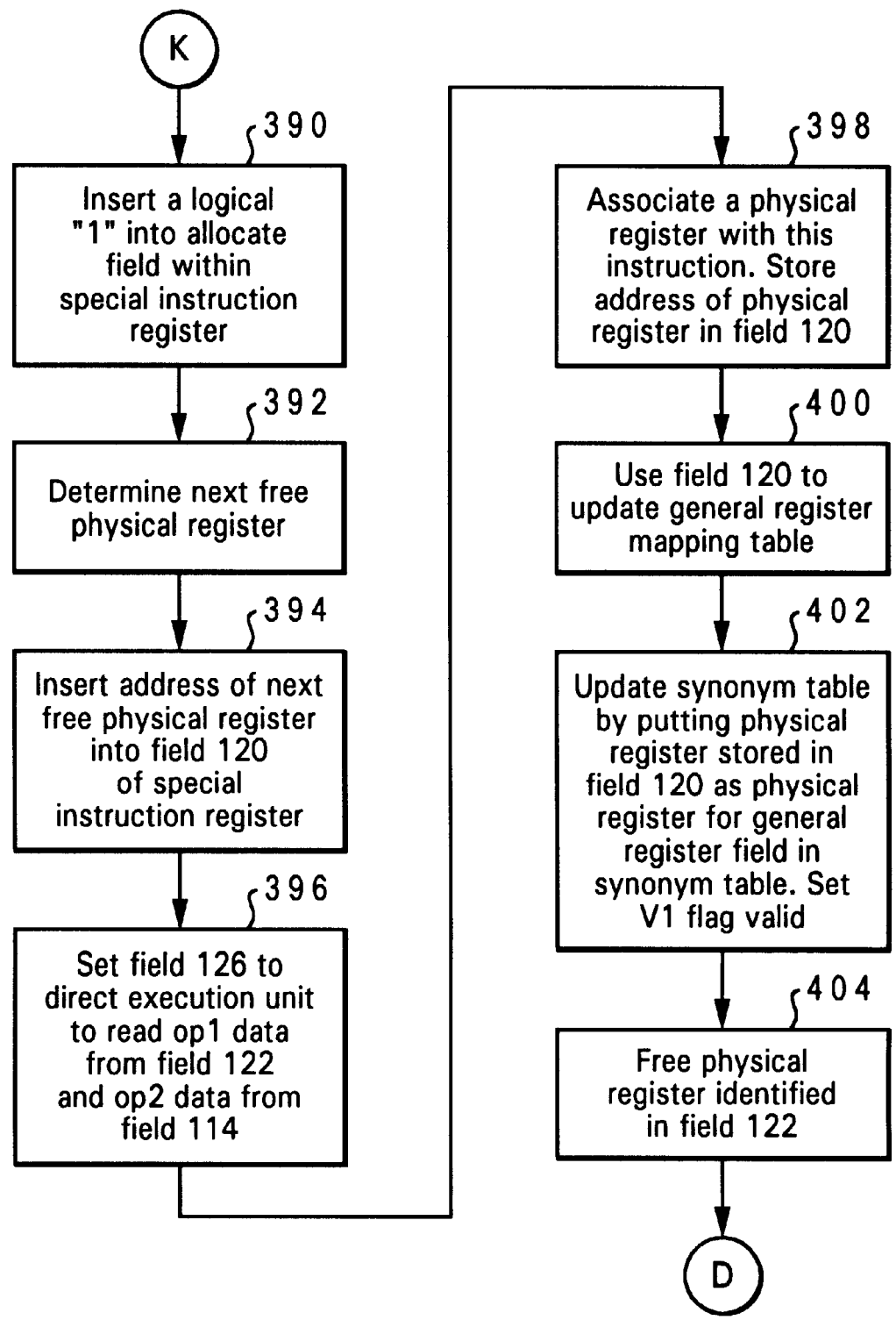

An exemplary embodiment of the present invention and its advantages are better understood by referring to FIGS. 1–28 of the drawings, like numerals being used for like and corresponding parts of the accompanying drawings.

A first related patent application, entitled "METHOD AND SYSTEM FOR THE TEMPORARY DESIGNATION OF ONE OF A PLURALITY OF PHYSICAL REGISTERS AS A GENERAL REGISTER", describes a method and system for temporarily designating one of a plurality of physical registers as a general register in a system where no general registers had been previously defined. In the disclosed method and system of this related application, any one of the plurality of available physical registers could be associated with any logical general register.

In accordance with the invention described in a second related application entitled, "METHOD AND SYSTEM FOR THE TEMPORARY DESIGNATION AND UTILIZATION OF A PLURALITY OF PHYSICAL REGISTERS AS A STACK", a plurality of physical registers are temporarily designated as a stack. Because the data is stored in physical registers, the accessing of the data stored in the stack is much faster than the previous systems and methods which implemented the stack in main memory or a cache.

The present invention combines the inventions of the two prior art disclosures and further enhances them to provide a method and system whereby execution of instructions is improved by moving only pointers to the data instead of moving the data itself.

Many instructions specify data to be moved between locations. These locations may include logical registers, logical stack registers, or main memory locations. The present invention improves execution of instructions which specify data to be moved between logical stack registers, and either logical registers or main memory by moving pointers to the data instead of moving or copying the data itself. During execution of these instructions, the data remains in its original location while only the pointer is moved. In addition, in order to improve performance of the data processing system, the pointer fields for storing the pointers will be smaller than the data bit length. For example, the data bit length may be 32 bits while the pointer is only 6 or 7 bits.

In register-based computer systems such as described above, operations that utilize data stored within the registers typically complete faster than those operations which utilize data stored elsewhere within the system, such as in a cache or main memory. Therefore, to maximize the performance of software that is processed by these systems, data should be kept in the physical registers.

Much of the data that is stored in the physical registers is of a transient or temporary nature. Transient data is generated and manipulated during a set of operations but is not stored once the operations have completed processing. For example, when performing a long scientific calculation, a number of partial results may be generated and discarded once the final result is calculated. Given the ability of current computer systems to simultaneously execute multiple operations, there exists the possibility that a large amount of transient data can exist at any given time within the computer system. Therefore, many computer architectures, such as the one described above, have a very large set of physical registers.

A new type of PUSH instruction was disclosed in the second related application. The new instruction is identified by the designation "*PUSH". The new instruction has an associated quantity of physical registers. The quantity associated with the *PUSH instruction identifies the number of physical registers to be temporarily designated as stack registers.

A new POP instruction was also disclosed. The new type POP instruction is designated as "*POP". The quantity associated with the *POP identifies the number of physical registers to be released from the temporarily designation as stack registers. When the physical registers are released, or freed, they become available for other types of processing including again being temporarily designated as stack registers.

The present invention depends on the prior execution of an instruction in accordance with either one or both of the related applications. For the purposes of the description which follows, an instruction will be allocated in two phases unless stated otherwise. The first allocation phase is the implementation of the related applications. Because the first allocation phase was fully described in the related applications, it will not be described below. The second allocation phase occurs after the first allocation phase and is described fully below. For example, for a LOAD instruction, the instruction will be allocated in a first allocation phase in accordance with the related applications. After the completion of the first allocation phase, the LOAD instruction will be stored in a special instruction register as described below and will have physical registers associated with the general register as described in the related application.

As an instruction is allocated in the second phase, a determination is made whether it is a particular type of instruction which moves data between a logical stack register and either a logical register or main memory. For instructions which move data between a stack register and either a logical register or main memory, the instruction will have been allocated in the first phase to have a physical register associated with the particular stack register, and a physical register associated with the logical register. Therefore, after the completion of the first allocation phase, the instruction is stored in a special instruction register which includes a pointer field which includes a pointer to the physical register which is associated with and contains the stack register data, and a pointer field which includes a pointer to the physical register which is associated with the general register and contains the data stored in the general register. For example, for a LOAD instruction which loads data from a stack register into a general register, the LOAD instruction stored in a special instruction register includes a pointer field including a pointer to the physical register which is associated with the particular stack, and a pointer field including a pointer to the physical register which is associated with the general register.

During the second allocation phase, the pointers stored in the pointer fields are modified such that the pointer which had pointed to the physical register associated with the general register is moved into the pointer field which points to the general register associated with the stack register. During the execution of this instruction, the data is not moved. In essence, the execution of the instruction was complete upon the completion of the second allocation phase. Therefore, the data in the stack register which was to be moved from the stack register into the general register remains in the physical register where it resided prior to the execution of this LOAD instruction. Only the pointer was moved into a different pointer field so that the pointer field which includes a pointer to the general register now includes a pointer to the physical register which contained the data.

The multiple instructions concurrently processed during one clock cycle may include a particular type of instruction. In a preferred embodiment, the particular type of instruction is an instruction which specifies data to be moved during processing of the instruction from a logical origination location to a logical destination location. The logical origination location, the logical destination location, or both locations are associated with one stack register included in a stack. Either the logical origination location or logical destination location may be associated with a general register, a main memory location, or cache location.

The particular type of instruction is associated with a first pointer field and a second pointer field. A pointer stored in the first pointer field becomes associated with the logical origination location because of its storage in the first pointer field. A pointer stored in the second pointer field becomes associated with the logical destination location because of its storage in the second pointer field.

A first pointer is associated with the instruction which identifies a physical location where the data is stored. In response to storing the first pointer in the first pointer field, the logical origination location becomes associated with the physical location where the data is stored.

When this instruction is processed, the first pointer is moved into the second pointer field. When the first pointer is stored in the second pointer field, the logical destination location becomes associated with the physical location. In this manner, when the instruction is processed, the data remains in its original physical location. The data is not moved or copied during the processing of the particular type of instruction.

FIG. 1 is a block diagram of a processor 10 system for processing information according to the preferred embodiment. In the preferred embodiment, processor 10 is a single integrated circuit superscalar microprocessor. Accordingly, as discussed further herein below, processor 10 includes various units, registers, buffers, memories, and other sections, all of which are formed by integrated circuitry. Also, in the preferred embodiment, processor 10 operates according to reduced instruction set computer ("RISC") techniques. As shown in FIG. 1, a system bus 11 is connected to a bus 14 interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a fetch controller and decoder 18. In response to such instructions from instruction cache 14, fetch controller and decoder 18 selectively outputs instructions to other execution circuitry of processor 10.

In fetch controller and decoder 18, in the preferred embodiment the execution circuitry of processor 10 includes multiple execution units, such as execution units 20, 21, 22, and 23. Execution units 20, 21, 22, and 23 input their source operand information from a plurality of physical registers 24. According to an important feature of the present invention, none of the physical registers 24 are initially designated as a particular general register. No general registers exist which are initially designated as particular general registers.

When processor 10 is initially powered up, physical registers 24 each have an associated address. In a preferred embodiment, physical registers 24 include 128 separate registers. Therefore, physical registers 24 may have addresses 1-128. Those skilled in the art will recognize that physical registers 24 may include any number of physical registers.

In response to a Load instruction which does not attempt to access a memory location included within a stack, information is input from data cache 16 and eventually copied to a selected one of physical registers 24. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, information is input from a selected one of physical registers 24 and copies such information to data cache 16.

Processor 10 achieves high performance by processing multiple instructions simultaneously at various ones of execution units 20, 21, 22, and 23. Accordingly, each instruction is processed as a sequence of stages, each being executable in parallel with stages of other instructions. Such a technique is called "pipelining". In a significant aspect of the illustrative embodiment, an instruction is normally processed in six or more stages, namely fetch, decode, dispatch, execute, and completion.

In the fetch stage, fetch controller and decoder 18 selectively inputs (from instructions cache 14) one or more instructions from one or more memory addresses and decodes up to four fetched instructions. These decoded instructions are stored in special instruction registers (SIR) 30, 32, 34, and 36.

In the dispatch stage, instruction processor and allocation unit 38 pre-processes and selectively dispatches up to four decoded instructions to selected ones of execution units 20, 21, 22, and 23. In the dispatch stage, operand information is supplied to the selected execution units for dispatched instructions. Processor 10 dispatches instructions in order of their programmed sequence.

In the execute stage, execution units 20, 21, 22, and 23 execute their dispatched instructions and output results (destination operand information) of their operations for storage at selected entries in physical registers 24. In this manner, processor 10 is able to execute instructions out-of-order relative to their programmed sequence.

In the completion stage, completion circuitry 25 is utilized so that the instructions are completed in their programmed order. When completion circuitry 25 receives a complete signal from each execution unit 20, 21, 22, and 23, completion circuitry 25 then signals execution table 62 to update execution table 62 to reflect which physical register is associated with a logical register name. The data or arithmetic result associated with each physical register which was temporarily assigned for execution has already been updated and stored into the physical register. In this manner, the writeback of the data has already been completed. A traditional writeback to general register stage is therefore unnecessary.

In the preferred embodiment, each instruction requires one machine cycle to complete each of the stages of instruction processing. Nevertheless, some instructions (e.g., complex fixed point instructions) may require more than one cycle. Accordingly, a variable delay may occur between a particular instruction's execution and completion stages in response to the variation in time required for completion of preceding instructions.

Superscalar data processing system 10 may concurrently process multiple instructions per clock cycle. For purposes of this specification, superscalar data processing system 10 may process up to four (4) instructions per clock cycle. Those skilled in the art will recognize that superscalar data processing system 10 may concurrently process any number of instructions per clock cycle.

FIG. 2 is a pictorial representation of the contents of fetch control and decoder 18 at a first clock cycle in accordance with the method and system of the present invention. The contents of fetch control and decoder 18 at a first clock cycle include instructions 42, 44, 46, and 48. Data 1, Temp, and Data 2 are all memory locations which are included within a stack.

At the first clock cycle, four instructions are fetched and decoded. Instruction 42 is associated with a logical register name of "2" which identifies general register 2. Instruction 42, therefore, attempts to load a copy of the data stored in a stack location "data 1" into general register 2. Instruction 44 is associated with a logical register name of "2" which identifies general register 2, and a logical register name of "3" which identifies general register 3. Instruction 44 attempts to add the contents of general register 2 to the contents of general register 3 and store the result of the addition as contents into general register 2. Instruction 46 is associated with a logical register name of "2" and attempts to store the contents of general register 2 into a stack location associated with a "TEMP" logical name. Instruction 48 is associated with a logical register name of "2" which identifies general register 2, and attempts to load a copy of the data stored in stack location "data 2" into general register 2.

In accordance with the method and system of the present invention, however, data is not moved or copied from/to memory locations data 1, data 2, or temp during the processing of instructions 42, 44, 46, or 48.

For this description, instruction N1 will be the first instruction decoded during a clock cycle, instruction N2 will be the second, instruction N3 will be the third, and instruction N4 will be the fourth. Therefore, for the first clock cycle, instruction 42 is instruction N1, instruction 44 is instruction N2, instruction 46 is instruction N3, and instruction 48 is instruction N4.

FIG. 3 depicts a pictorial representation of a general register table 60, after each instruction shown in FIG. 2 is allocated, which is utilized to maintain a temporary designation of physical registers as general registers in accordance with the method and system of the present invention. FIG. 3 illustrates table 60 at the end of the second allocation phase.

Table 60 includes a plurality of fields. Each field is associated with a different logical register name which identifies a particular general register. For example, field 64 is associated with a logical register name of "2" which identifies general register 2. Field 66 is associated with a logical register name of "3" which identifies general register 3. Field 68 is associated with logical register name "8" which identifies general register 8.

Table 60 is updated at the end of the second allocation phase of each clock cycle. Once the second allocation phase is complete, table 60 is updated by inserting an identification of the physical register into a field within table 60 associated with the general register which is identified by the logical register name for the last load register instruction to be allocated. The example values shown in FIG. 3 will be described more fully below.

FIG. 4 illustrates a pictorial representation of contents of physical registers, after each instruction shown in FIG. 2 is allocated during the second phase, in accordance with the method and system of the present invention. For example, after the second allocation phase of instruction 42, physical register 10 includes the value of "data 1", and physical register 11 includes a previously stored value "value3". After the second allocation phase of instruction 44, physical register 10 includes the value of "data1", physical register 11 includes "value3", and the result of the ADD instruction is stored in physical register 64 as "SUM". After the second allocation phase of instruction 46, physical register 10 still includes the value of "data1", physical register 11 still includes a "value3", and physical register 64 still includes "SUM". After the second allocation phase of instruction 48, physical register 10 still includes the value of "data1", physical register 11 still includes a "value3", physical register 64 still includes "SUM", and physical register 28 now includes a value of "data2".

FIG. 5 depicts a pictorial representation of a special instruction register 100 and its associated fields for a LOAD, STORE, or LOGICAL/ARITHMETIC type instruction in accordance with the method and system of the present invention. Special instruction register (SIR) 100 includes an op code field 102 logical register field 104, logical stack register or base register field 106, displacement field 108, virtual stack flag field 110, stack register number field 112, physical register identifier of stack field 114, a built storage address field 116, an allocate field 118, physical register A field 120, physical register B field 122, physical register C field 124, and execution unit setup field 126.

Op code field 102 includes the op code for the particular instruction stored in special instruction register 100. Logical register field 104 includes an identification of the logical register associated with the instruction stored in SIR 100. The instruction stored in SIR 100 is an instruction which has an associated logical register, and associated logical stack register name. Base field 106 includes a base register or stack register associated with the instruction. Displacement field 108 includes the displacement from the base register of field 106 to be utilized to generate a complete storage address. Virtual stack flag field 110 is utilized to store a logical "1" when field 106 includes the address of a stack register which is associated with a physical register. Stack register number field 112 includes a stack register number which is associated with combination of the base field 106 and the displacement field 108. Physical register identifier field 114 identifies the physical register which is associated with the stack register number stored in field 112. Built storage address field 116 includes the complete built address of bits 31-0 of the stack register stored in fields 106 plus 108. To generate a complete address for this stack register, the contents of field 106 are added to the contents of displacement field 108. A logical one is associated with the allocate field 118 for each "LOAD" instruction. Field 118 includes a "1" when the instruction associated with this special instruction register is a LOAD instruction.

Instructions which are not load register instructions, such as instructions 44 and 46 are also each associated with a special instruction register. For these instructions, allocate field 118 will include a logical zero. The remaining fields will be utilized to store information as described.

Physical register A field 120 is utilized when the instruction stored in special instruction register 100 is an arithmetic instruction. Physical register A field 120 is utilized to store the identification of the physical register which holds the result of the arithmetic calculation. Physical register B field 122 is utilized to store the identification of the physical register associated with the logical register identified in field 104. Physical register C field 124 is utilized to store the identification of the physical register associated with the logical or stack register identified in field 106. Execution unit setup field 126 includes information to be passed to the appropriate execution unit which is to execute the instruction associated with special instruction register 100.

FIG. 6 depicts a pictorial representation of a special instruction register 130 and its associated fields for an instruction which moves data between memory locations in accordance with the method and system of the present invention. Special instruction register (SIR) 130 includes an op code field 132, base register 1 or logical stack register field 134, displacement 1 field 136, base register 2 or logical stack register field 138, displacement 2 field 140, virtual stack flag field 142, stack register number field 144, physical register identifier field 146, and a built storage address field 148.

Op code field 132 includes the op code for the particular instruction stored in special instruction register 130. Logical register field 134 includes an identification of the logical register associated with the instruction stored in SIR 132. The instruction stored in SIR 132 is an instruction which has associated with it a memory location and a logical stack register. Logical stack register or base register field 134 includes either a stack register or a base register associated with the instruction. Displacement field 136 includes the displacement from either the stack register or the base register stored in field 134 to be utilized to generate a complete storage address. Logical stack register or base register field 138 includes either a stack register or a base register associated with the instruction. Displacement field 140 includes the displacement from either the stack register or the base register stored in field 140 to be utilized to generate a complete storage address. Virtual stack flag field 142 is utilized to store a logical "1" when either field 134 or field 138 includes the address of a stack register which is associated with a physical register. Stack register number field 144 includes a stack register number which is associated with the stack register stored in either field 134 or field 140. Physical register identifier field 146 identifies the physical register which is associated with the stack register stored in either field 134 or field 138. Built storage address field 148 includes the complete built address of bits 31–0 of the stack register stored in either field 134 or field 138 and their respective displacement fields 136 or 140.

FIG. 7 depicts a pictorial representation of a stack register table 160 utilized to maintain a record of logical stack register numbers associated with physical registers in accordance with the method and system of the present invention. Table 160 includes columns 170 and 172. Table 160 includes a plurality of entries, each entry including a stack register in each column 170 and 172. The data stored in column 170 includes the stack register number. The data stored in column 172 includes an identification of the physical register associated with each stack register. Therefore, for example, a "*PUSH 2, reg1" instruction is processed, two physical registers will be temporarily designated as stack registers. The stack pointer, or stack register, "reg1" will identify the logical address of the top of the stack. For example, entry 162 indicates that stack register 30 is associated with physical register 10. Entry 164 indicates that stack register 25 is associated with physical register 28.

For a particular instruction which includes a reference to a stack register, the special instruction register will include the stack register number in either field 112 or 144, the complete address including the address from column 170 in either field 116 or 148, and the identification of the temporarily designated physical register in column 172 stored in either field 114 or 146. The virtual stack flag would be set in either field 110 or 142.

FIG. 8 is a pictorial representation of a synonym table 180 utilized to maintain a current record of physical registers, general registers, and stack registers in accordance with the method and system of the present invention. Table 180 includes columns 182, 184, 186, 188, and 190. Table 180 includes a plurality of rows, one associated with each physical register. For example, row 192 is associated with physical register 10. Each row includes a physical register ID field 194, a general register field 196, a stack register field 198, a flag V1 field 200, and a flag V2 field 202.

General register field 196 will include an identification of a general register associated with the physical register associated with this particular row. Stack register field 198 will include an identification of a stack register associated with the physical register associated with this particular row. Flag V1 field 200 will include an indication of whether the association between the general register and physical register of this particular row is currently valid. Flag V2 field 202 will include an indication of whether the association between the stack register and physical register of this particular row is currently valid.

FIG. 9 is a high level flow chart depicting the establishment of an allocation table, an execution table, a stack register table, a synonym table, and a plurality of special instruction registers in accordance with the method and system of the present invention. The process starts as depicted at block 220 and thereafter passes to block 222 which illustrates the establishment of a table 60 having a plurality of fields. Each of the fields is associated with a different general register. Next, block 224 depicts the establishment of an execution table having a plurality of fields. Each of these fields is associated with a different general register. The process then passes to block 225 which illustrates the establishment of a stack register table. The stack register table has a plurality of rows. Each of these rows is associated with a logical stack register and its associated physical register.

Next, the process passes to block 226 which depicts the establishment of a synonym table including a plurality of rows. Each row is associated with one of the physical registers. Each row may include an identification of a general register and/or stack register associated with the physical register associated with the row. In addition, two flag fields are included for indicating whether the association between the physical register, and the general register and/or stack register identified in the row are valid. Block 227 then illustrates the establishment of a special instruction register for each instruction to be concurrently processed. In the preferred embodiment, four instructions are concurrently executed. Therefore, there are four different special instruction registers (SIR's), one for each instruction. Next, block 228 depicts the association of a plurality of fields with each special instruction register. The process then terminates as depicted at block 230.

FIGS. 10–19 together are a high level flow chart illustrating the processing of an instruction in accordance with the method and system of the present invention. The process starts as illustrated by block 250 and thereafter passes to block 252 which depicts the allocation of all instructions in accordance with the prior related applications. In this manner, the instructions, except ADD instructions, have all completed the first phase of allocation. All such instructions have been initially allocated and have been stored in special instruction registers in accordance with the related applications. Next, block 254 illustrates allocating a physical register for each logical registers for ADD type instructions, as well as allocating a physical register for storage of the SUM which was the result of ADD instruction. Thereafter, block 256 depicts the updating of the synonym table after allocation of physical registers with general registers for each instruction. The identification of the physical register is stored in the synonym table, and the V1 valid flag is set.

The process then passes to block 258 which illustrates getting an instruction from a special instruction register.

Next, block 260 depicts the building of the address for destination and/or source as appropriate. The built address is then stored. Thereafter, block 262 illustrates a determination of whether or not the instruction currently being processed is a *PUSH instruction. If a determination is made that the instruction is a *PUSH instruction, the process passes to block 264 which depicts updating the synonym table by putting the physical register stored in field 114 as the physical register associated with the stack register and setting V2 flag stored in field 190 valid. Next, block 266 illustrates the second allocation phase for this instruction being complete. The process then passes back to block 258.

Referring again to block 262, if a determination is made that the current instruction is not a *PUSH instruction, the process passes to block 268 which depicts a determination of whether or not the instruction currently being processed is a *POP instruction. If a determination is made that the current instruction is a *POP instruction, the process passes to block 270 which illustrates using the synonym table to set V2 flags invalid for each physical register specified at field 172. Next, block 272 depicts marking each physical register as free for reallocation which also have an invalid flag V1 stored in field 188. The process then passes to block 266.

Referring again to block 268, if a determination is made that the current instruction is not a *POP instruction, the process passes to block 274. Block 274 illustrates a determination of whether or not the built address is the same as a stack address for the destination or source for the current instruction. If a determination is made that the built address is not the same as either the destination or source address, the process passes to block 266. The process then passes back to block 258. Referring again to block 274, if a determination is made that the built address is the same as either the destination or source address, the process passes to block 276.

Block 276 illustrates a determination of whether or not the current instruction is a MOVE type instruction. If a determination is made that the current instruction is a MOVE type instruction, the process passes to block 278 which depicts a determination of whether or not the destination address is the same as one of the stack addresses. If a determination is made that the destination address is the same as one of the stack addresses, the process passes to block 286 which illustrates the association of a free physical register with a stack register which is associated with the destination address. Next, block 288 depicts the storage of the physical register number as the identifier in field 172 of the stack register table in the entry associated with this stack register. Next, block 290 illustrates the updating of the synonym table by storing the stack register number in field 186 for the associated physical register number. Thereafter, block 292 depicts the setting of the V2 flag, in field 190, valid. The process then passes to block 294 which illustrates the storage of the physical register number in field 146 for this instruction. Next, block 296 depicts the storage of the stack register number in field 144. Block 298, then, illustrates the setting of the Vflag in field 142 equal to "1" to indicate that the current instruction is accessing the stack. Thereafter, block 300 depicts freeing the physical register previously assigned where the V1 flag, in field 188, is set equal to "0". The process then passes to block 266.

Referring again to block 278, if a determination is made that the destination address is not the same as one of the stack addresses, the process passes to block 266. Referring again to block 282, if a determination is made that the destination address is the same as one of the stack addresses, the process passes to block 284.

Block 284 illustrates the storage of the stack register number in field 114. Next, block 302 depicts the setting of the VFlag in field 142 to "1" to indicate that this instruction is accessing a stack register. Thereafter, block 304 illustrates a determination of whether or not there is another special instruction register which has a logical one included in valid stack field 110 or 142. If a determination is made that there is a special instruction register having a logical one included in valid stack field 110 or 142, the process passes to block 306 which depicts a comparison of the stack register number associated with this instruction with the stack register number associated with all previous LOAD instructions having a "1" in the valid stack field.

Thereafter, block 308 illustrates a determination of whether or not the stack register number associated with the current instruction is the same stack register number associated with a previous "LOAD" register instruction in this cycle. If a determination is made that the stack register number associated with the current instruction is the same stack register number associated with a previous "LOAD" register instruction in this cycle, the process passes to block 310 which illustrates a determination of which instruction had the same associated stack register number. Thereafter, block 312 depicts putting the address for the physical register for the closest instruction associated with the closest instruction having the same stack register number into physical register field 146. The process then passes to block 322.

Referring again to block 308, if a determination is made that the stack register number associated with the current instruction is not the same stack register number associated with any previous "LOAD" register instruction in this cycle, the process passes to block 314 which illustrates reading stack register table 160 using the stack register number associated with this instruction to determine the physical register associated with this stack register number. Block 316, then, depicts the insertion of the address of this physical register into physical register field 146 of the special instruction register for this instruction. The process then passes back to block 322.

Referring again to block 304, if a determination is made that there is not another special instruction register having a logical one included in valid stack field 110 or 142, the process passes to block 318 which depicts reading stack register table 160 using the stack register number associated with this instruction to determine the physical instruction associated with this stack register number. Block 320, then, depicts the insertion of the address of this physical register into physical register field 146 of the special instruction register for this instruction. The process then passes to block 322.

Referring again to block 276, if a determination is made that the current instruction is not MOVE type instruction, the process passes to block 280 which depicts a determination of whether or not the current instruction is either a LOAD, STORED, or ARITHMETIC/LOGICAL instruction. If a determination is made that the current instruction is not either a LOAD, STORED, or ARITHMETIC/LOGICAL instruction, the process passes to block 266. Referring again to block 280, if a determination is made that the current instruction is either a LOAD, STORED, or ARITHMETIC/ LOGICAL instruction, the process passes to block 324.

Block 324 illustrates a determination of whether or not there is another special instruction register which has a logical one included in its allocate field 118. If a determination is made that there is a special instruction register having a logical one included in allocate field 118, the process passes to block 326 which depicts a comparison of the logical register name associated with this instruction with the logical register name associated with all previous LOAD instructions in this cycle.

Thereafter, block 328 illustrates a determination of whether or not the logical register name associated with the current instruction is the same logical register name associated with a previous "LOAD" register instruction in this cycle. If a determination is made that the logical register name associated with the current instruction is the same logical register name associated with a previous "LOAD" register instruction in this cycle, the process passes to block 330 which illustrates a determination of which instruction had the same associated logical register name. Thereafter, block 332 depicts putting the address for the physical register for the closest instruction having the same logical register name into physical register field 122. The process then passes to block 342.

Referring again to block 328, if a determination is made that the logical register name associated with the current instruction is not the same logical register name associated with any previous "LOAD" register instruction in this cycle, the process passes to block 334 which illustrates reading allocation table 60 using the logical register name associated with this instruction to determine the physical register associated with this logical register name. Block 336, then, depicts the insertion of the address of this physical register into physical register field 122 of the special instruction register for this instruction. The process then passes back to block 342.

Referring again to block 324, if a determination is made that there is not another special instruction register having a logical one included in allocation field 118, the process passes to block 338 which depicts reading allocation table 60 using the logical register name associated with this instruction to determine the physical instruction associated with this logical register name. Block 340, then, depicts the insertion of the address of this physical register into physical register field 122 of the special instruction register for this instruction. The process then passes to block 342.

Block 342 illustrates a determination of whether or not there is another special instruction register which has a logical one included in valid stack field 110 or 142. If a determination is made that there is a special instruction register having a logical one included in valid stack field 110 or 142, the process passes to block 344 which depicts a comparison of the stack register number associated with this instruction with the stack register number associated with all previous LOAD instructions having a "1" in the valid stack field.

Thereafter, block 346 illustrates a determination of whether or not the stack register number associated with the current instruction is the same stack register number associated with a previous "LOAD" register instruction in this cycle. If a determination is made that the stack register number associated with the current instruction is the same stack register number associated with a previous "LOAD" register instruction in this cycle, the process passes to block 348 which illustrates a determination of which instruction had the same associated stack register number. Thereafter, block 350 depicts putting the address for the physical register for the closest instruction having the same stack register number into physical register field 114. The process then passes to block 322.

Referring again to block 346, if a determination is made that the stack register number associated with the current instruction is not the same stack register number associated with any previous "LOAD" register instruction in this cycle, the process passes to block 352 which illustrates reading stack register table 160 using the stack register number associated with this instruction to determine the physical register associated with this stack register number. Block 354, then, depicts the insertion of the address of this physical register into physical register field 114 of the special instruction register for this instruction. The process then passes back to block 322.

Referring again to block 342, if a determination is made that there is not another special instruction register having a logical one included in valid stack field 110 or 142, the process passes to block 356 which depicts reading stack register table 160 using the stack register number associated with this instruction to determine the physical instruction associated with this stack register number. Block 358, then, depicts the insertion of the address of this physical register into physical register field 114 of the special instruction register for this instruction. The process then passes to block 322.

Block 322 illustrates a determination of whether or not the instruction currently being allocated in the second phase of the allocation cycle is a LOAD instruction. If a determination is made that the instruction is not a LOAD instruction, the process passes to block 360 which depicts a determination of whether or not the instruction is a STORE instruction. If a determination is made that the instruction is not a STORE instruction, the process passes to block 362 which depicts a determination of whether or not the instruction is an ARITHMETIC/LOGICAL instruction. If a determination is made that the instruction is not an ARITHMETIC/LOGICAL instruction, the process passes to block 431.

Referring again to block 322, if a determination is made that the instruction is a LOAD instruction, the process passes to block 370. Referring again to block 360, if a determination is made that the instruction is a STORE instruction, the process passes to block 380. Referring again to block 362, if a determination is made that the instruction is an ARITHMETIC/LOGICAL instruction, the process passes to block 390.

Block 370 illustrates a determination of whether or not the physical register identified in field 114 is the same as the physical register identified in field 122. If a determination is made that the physical register identified in field 114 is the same as the physical register identified in field 122, the process passes to block 378. Referring again to block 370, if a determination is made that the physical register identified in field 114 is not the same as the physical register identified in field 122, the process passes to block 372 which depicts the putting of the physical register identifier stored in field 114 into the general register table 60. Thereafter, block 374 illustrates the freeing of the physical register specified in field 122. Next, block 376 depicts the updating of the synonym table 180 by putting the physical register stored in field 114 as the physical register associated with this general register into the synonym table, and the setting of the valid flag V1 as valid. Thereafter, block 378 illustrates the setting of a NOP flag in field 126. The process passes to block 266.

Block 380 illustrates a determination of whether or not the physical register identified in field 114 is the same as the physical register identified in field 122. If a determination is made that the physical register identified in field 114 is the same as the physical register identified in field 122, the process passes to block 388. Referring again to block 380, if a determination is made that the physical register identified in field 114 is not the same as the physical register identified in field 122, the process passes to block 382 which depicts the putting of the physical register identifier stored in field 122 into the stack register table 160. Thereafter, block 384 illustrates the freeing of the physical register specified in field 114. Next, block 386 depicts the updating of the synonym table 180 by locating the row of the table associated with this physical register, and putting the stack register number into field 198 for that row. Thereafter, block 388 illustrates the setting of a NOP flag in field 126. The process passes to block 266.

Block 390 illustrates the insertion of a logical "1" into allocate field 118 within the special instruction register for this instruction. Next, block 392 depicts the determination of the next free physical register. Thereafter, block 394 illustrates the insertion of the address of the next free physical register into field 120 of the special instruction register. Thereafter, block 396 depicts the setting of field 124 to direct the execution unit to read operand 1 data from field 122 and operand 2 data from field 114. The process then passes to block 398 which illustrates the association of a physical register with this instruction. The address of this physical register is stored in field 120. Next, block 400 depicts the utilization of field 120 to update general register table 60. Block 402, then, illustrates the updating of the synonym table 180 by putting the physical register stored in field 120 as the physical register for general register field in synonym table. The V1 flag is set valid. Next, block 404 depicts the freeing of the physical register identified in field 122. The process then passes back to block 266.

Figure 20:
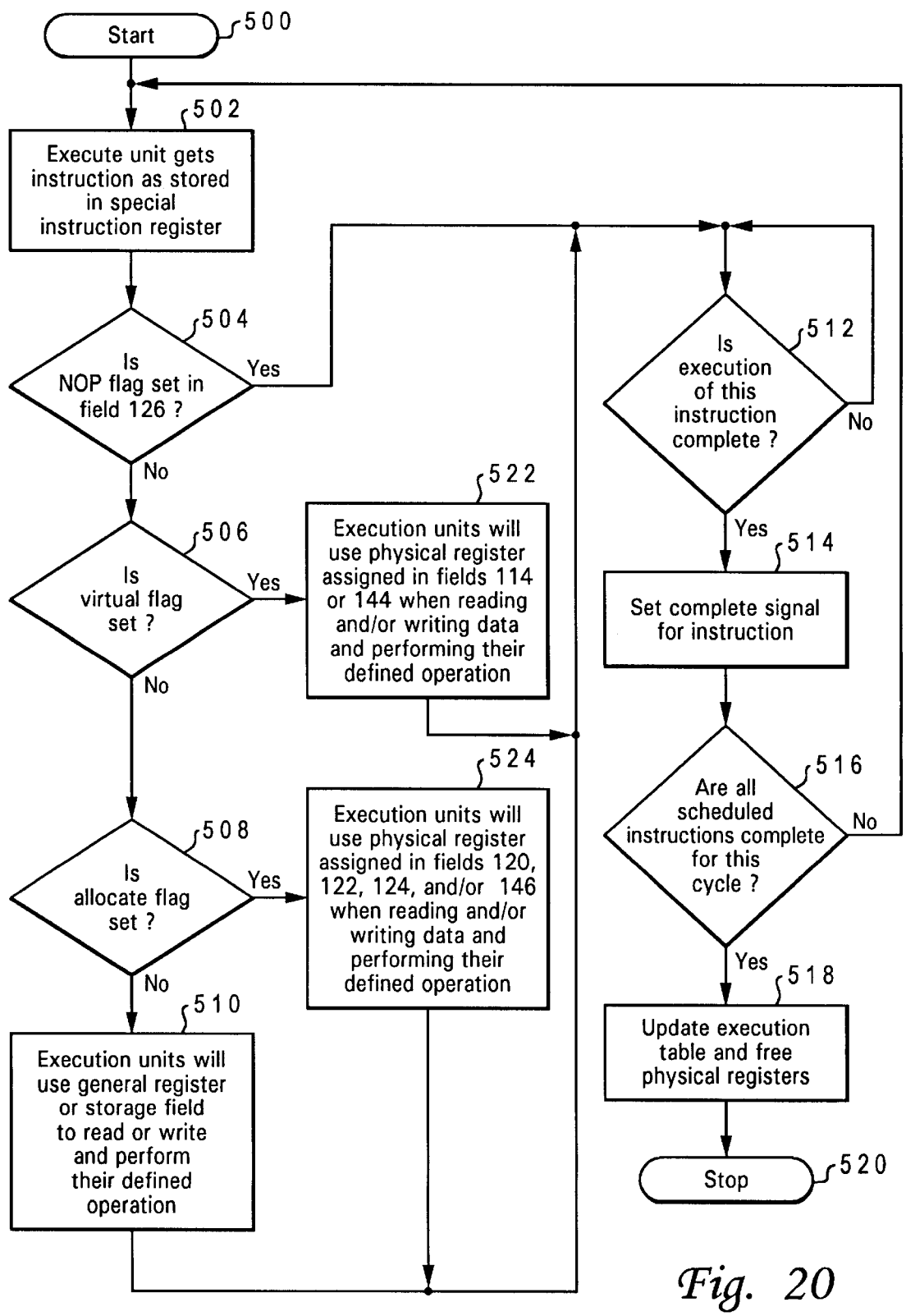
FIG. 20 is a high level flow chart depicting the execution of an instruction in accordance with the method and system of the present invention.

FIG. 20 is a high level flow chart illustrating an execution cycle in accordance with the method and system of the present invention. The process starts as depicted at block 500 and thereafter passes to block 502 which illustrates an execution unit getting an instruction to execute which is stored in a special instruction register. Next, block 504 depicts a determination of whether or not a NOP flag is set in field 126. If a determination is made that a NOP flag is not set in field 126, the process passes to block 506 which illustrates a determination of whether or not a virtual stack flag is set in either field 110 or 142. If a determination is made that a virtual stack flag is not set, the process passes to block 508 which illustrates a determination of whether or not an allocate flag is set in field 118.

If a determination is made that an allocate flag is not set, the process passes to block 510 which depicts the execution unit executing the instruction using the general register or storage field to read or write and to perform the operation specified by that instruction's op code. If this point in the process is reached, the instruction currently being executed does not access the virtual stack, and is not a LOAD instruction.

The process then passes to block 512 which depicts a determination of whether or not the execution of the current instruction is complete. If a determination is made that the execution of the current instruction is not complete, the process passes back to block 512. Referring again to block 512, if a determination is made that execution of the current instruction is complete, the process passes to block 514 which illustrates the setting of a complete signal for this instruction. Next, block 516 depicts a determination of whether or not all scheduled instructions have completed execution for this cycle. If a determination is made that there are more scheduled instruction yet to complete execution for this cycle, the process passes back to block 502. Referring again to block 516, if a determination is made that all scheduled instructions have completed execution for this cycle, the process passes to block 518 which depicts the updating of the execution table and the freeing of the physical registers. The process then terminates as illustrated at block 520.

Referring again to block 504, if a determination is made that a NOP flag is set in field 126, the process passes to block 512. If this point in the process is reached, the current instruction does not need to be executed. No movement or copying of data was necessary for execution of this instruction.

Referring again to block 506, if a determination is made that a virtual stack flag is set, the process passes to block 522 which illustrates the execution unit using the physical register assigned in fields 114 or 144 when reading and/or writing data, and performing the function defined by this instruction's op code. The process then passes to block 512.

Referring again to block 508, if a determination is made that an allocate flag is set, the process passes to block 524 which illustrates the execution unit using the physical register assigned in fields 120, 122, 124, and/or 146 when reading and/or writing data, and performing the function defined by this instruction's op code. The process then passes to block 512.

FIGS. 21–28 are provided as exemplary special instruction registers to further explain the invention. FIGS. 21–24 are examples of special instruction registers for instructions 42–28 after the first allocation phase. FIG. 21 is a pictorial representation of a special instruction register storing instruction 42 after the instruction has completed the first allocation phase in accordance with the related applications. As is shown, the LOAD instruction attempts to load a value called "data1" into general register 2. Physical register 40 has been allocated to this instruction and associated with general register 2. The special instruction register for instruction 42 also indicates that the value "data1" is located in stack register 30 which is associated with a physical register 10. Because this instruction utilizes the stack, and also because it is a LOAD instruction, a logical "1" is stored in both field 110 and 118. Field 106 indicates that the top of the stack, i.e. the stack pointer, is stored in general register 8. The displacement from the value stored in general register 8 is the value "1st displacement" stored in field 108. This location in the stack is identified as stack register 30, and is stored in physical register 10.

FIG. 22 is a pictorial representation of a special instruction register storing instruction 44 after the instruction has completed the first allocation phase in accordance with the related applications. As is shown, the ADD instruction attempts to add the contents of general register 3 to the contents of general register 2, and then to store the result of the addition in general register 2. Physical register 40 has been inherited from instruction 42 because it was previously allocated for general register 2. At the first phase of the allocation cycle, a physical register is not allocated for storage of the SUM of the addition. However, instruction 44 also inherits physical register 11 as being allocated for general register 3. A previous, not described, operation allocated physical register 11 for general register 11.

FIG. 23 is a pictorial representation of a special instruction register storing instruction 46 after the instruction has completed the first allocation phase in accordance with the related applications. As is shown, the STORE instruction attempts to store a value from general register 2 into a location called "temp". Physical register 40 had previously been allocated for general register 2, so it is stored in field 122. The special instruction register indicates that this instruction does access a stack location, "temp" by including a logical "1" in field 110. Because this instruction is not a LOAD, allocate field 118 includes a logical "0".

FIG. 24 is a pictorial representation of a special instruction register storing instruction 48 after the instruction has completed the first allocation phase in accordance with the related applications. As is shown, the LOAD instruction attempts to load a value called "data2" into general register 2. Physical register 45 has been allocated to this instruction and associated with general register 2. The special instruction register for instruction 48 also indicates that the value "data2" is located in stack register 25 which is associated with a physical register 28. Because this instruction utilizes the stack, and also because it is a LOAD instruction, a logical "1" is stored in both field 110 and 118.

FIGS. 25–28 are examples of the same special instruction register shown in corresponding FIGS. 21–24 after the second allocation phase. FIG. 25 is a pictorial representation of a special instruction register storing instruction 42 after the instruction has completed the second allocation phase in accordance with the present invention. As is shown, the LOAD instruction attempts to load a value called "data1" into general register 2. Because the value "data1" was stored in the stack in physical register 10, the data is not moved. However, a new pointer is included in field 122 which now identifies physical register 10 as the location of the data. The remaining fields in this special instruction register are unchanged.

FIG. 26 is a pictorial representation of a special instruction register storing instruction 44 after the instruction has completed the second allocation phase in accordance with the present invention. The value in field 122 is updated to reflect the location of the data identified by general register 2. Therefore, field 122 now points to physical register 10 as the location for the value of general register 2. A physical register 64 has been allocated to this instruction as the location of the SUM of the addition. Therefore, the allocation field includes a logical "1" to indicate this allocation. The remaining fields are unchanged.

FIG. 27 is a pictorial representation of a special instruction register storing instruction 46 after the instruction has completed the second allocation phase in accordance with the present invention. As described above, this instruction register also inherits the new location for general register 2 as being physical register 10. The remaining fields are unchanged.

FIG. 28 is a pictorial representation of a special instruction register storing instruction 48 after the instruction has completed the second allocation phase in accordance with the present invention. Because this instruction utilizes the stack, and also because it is a LOAD instruction, a logical "1" is stored in both field 110 and 118. Because the value "data2" was stored in the stack in physical register 28, the data is not moved. However, a new pointer is included in field 122 which now identifies physical register 28 as the location of the data. The remaining fields in this special instruction register are unchanged.

FIG. 3 depicts the general register table 60 after the completion of the second allocation phase for each instruction. Therefore, after instruction 42 has completed the second phase, general register 2 is associated with physical register 10, general register 3 is associated with physical register 11, and the stack pointer stored in general register 8 is associated with physical register 12. After instruction 44 has completed the second phase, general register 2 is associated with physical register 64, general register 3 is still associated with physical register 11, and general register 8 is still associated with physical register 12. After instruction 46 has completed the second phase, general register 2 is associated with physical register 64, general register 3 is associated with physical register 11, general register 8 is associated with physical register 12, and a "temp" location is associated with general register 9. After instruction 48 has completed the second phase, general register 2 is now associated with physical register 28, general register 3 is associated with physical register 11, general register 8 is associated with physical register 12, and a "temp" location is associated with general register 9.

While a preferred embodiment has been particularly shown and described, it will be understood by those skilled in the art that various changes in form and detail may be made therein without departing from the spirit and scope of the present invention.

What is claimed is:

1. A method in a superscalar data processing system for efficiently processing an instruction, said data processing system including multiple instructions to be processed during a single clock cycle, wherein said instruction is one of said multiple instructions, said method comprising the steps of:

determining if said instruction is a particular type of instruction which specifies data to be moved or copied during processing of said instruction from a logical origination location to a logical destination location; and in response to a determination that said instruction is said particular type of instruction:

temporarily designating a first plurality of physical registers as a stack;

establishing a first pointer field associated with said instruction for associating a pointer stored in said first pointer field with said logical origination location;

associating a first pointer with said instruction, said first pointer identifying a physical location wherein said data is stored;

in response to a storage of said first pointer in said first pointer field, associating said logical origination location with said physical location;

establishing a second pointer field associated with said instruction for associating a pointer stored in said second pointer field with said logical destination location; and processing said instruction by storing said first pointer in said second pointer field, whereby said logical destination location becomes associated with said physical location, wherein said data is not copied and remains in its original physical location during said processing of said instruction.

2. The method according to claim 1, further comprising the step of establishing a second plurality of physical registers, wherein none of said second plurality of physical registers are initially designated as one of a plurality of general registers.

3. The method according to claim 2, further comprising the step of associating said logical origination location with a first of said second plurality of physical registers.

4. The method according to claim 3, further comprising the step of said data being stored in said first of said second plurality of physical registers.

5. The method according to claim 4, further comprising the step of said data remaining in said first of said second plurality of physical registers and not being copied during said processing of said instruction.

6. The method according to claim 5, wherein said step of associating a first pointer with said instruction, said first pointer identifying a physical location wherein said data is stored further comprises the step of associating a first pointer with said instruction, said first pointer identifying said first of said second plurality of physical registers wherein said data is stored.

7. The method according to claim 6, further comprising the step of said logical origination location being associated with one of said plurality of general registers.

8. The method according to claim 1, further comprising the step of said logical destination location being associated with one of said first plurality of said plurality of physical registers temporarily designated as a stack.

9. The method according to claim 8, further comprising the step of associating a second pointer with said instruction, said second pointer pointing to said logical destination location.

10. The method according to claim 9, further comprising the steps of:

for each of said multiple instructions, determining if said each of said multiple instructions is a second particular type of instruction;

in response to said each of said multiple instructions being said second particular type of instruction, determining if said each of said multiple instructions is associated with at least one of a plurality of logical register names, wherein each of said plurality of logical register names identifies a different one of said plurality of general registers; and in response to said each of said multiple instructions being associated with said at least one of said plurality of logical register names which identifies a particular one of said plurality of general registers, temporarily designating one of said second plurality of physical registers as said particular one of said plurality of general registers, wherein said one of said second plurality of physical registers is temporarily utilized as said particular one of said plurality of general registers.

11. The method according to claim 10 further comprising the steps of:

establishing a different special instruction register for each of said multiple instructions; and establishing a plurality of fields within said special instruction register.

12. The method according to claim 11 wherein said step of determining if said each of said multiple instructions is said second particular type of instruction further includes determining if said each of said multiple instructions is a load register instruction.

13. The method according to claim 12 further comprising the step of for each of said multiple instructions which is a load register instruction, associating a different one of said second plurality of physical registers with said each of said multiple instructions which is a load register instruction.

14. The method according claim 13 further comprising the steps of:

establishing a physical register field in said special instruction register; and storing an indication of said different one of said second plurality of physical registers associated with said each of said multiple instructions which is associated with said special instruction register in said physical register field.

15. The method according to claim 14, further comprising the step of utilizing said stored indication of said different one of said second plurality of physical registers associated with said each of said multiple instructions which is associated with said special instruction register to temporarily designate said one of said plurality of physical registers as said particular one of said plurality of general registers.

16. The method according to claim 15, further comprising the steps of:

designating one of said plurality of fields within said special instruction register as an allocation field;

determining if said each of said multiple instructions for which said special instruction register is established is a load register instruction;

in response to a determination that said each of said multiple instructions for which said special instruction register is established is a load register instruction, storing a first indicator in said allocation field; and in response to a determination that said each of said multiple instructions for which said special instruction register is established is not a load register instruction, storing a second indicator in said allocation field.

17. The method according to claim 16, further comprising the steps of:

establishing a general register table;

establishing a plurality of fields within said general register table, each of said plurality of fields being associated with a different one of said plurality of logical register names, wherein each of said plurality of fields identifies a different one of said plurality of general registers; and for each said special instruction register including said first indicator stored in said allocation field, storing said indication of said one of said second plurality of physical registers associated with said each of said multiple instructions which is associated with said special instruction register in said one of said plurality of fields within said general register table, wherein said one of said second plurality of physical registers is stored in said field is temporarily utilized as said one of said plurality of general registers identified by said one of said plurality of fields.

18. The method according to claim 17, further comprising the step of associating a different logical stack register number with each of said first plurality of said plurality of physical registers to temporarily designate said first plurality of said plurality of physical registers as a stack.

19. The method according to claim 18, further comprising the steps of:

establishing a stack register table for storing a plurality of entries; and each of said plurality of entries including an identification of a logical stack register number and an identification of one of said first plurality of said plurality of physical registers which is associated with said logical register number.

20. The method according to claim 19 further comprising the steps of:

for each of said multiple instructions, determining if said each of said multiple instructions is a third type of instruction which is associated with one of said logical stack register numbers;

establishing a physical register field and a logical stack register field in said special instruction register;

in response to said each of said multiple instructions being said third type of instruction, storing said identification of said logical stack register number in said logical stack register field, and storing said identification of one of said first plurality of said plurality of physical registers which is associated with said logical register number in said physical register field.

21. The method according to claim 20, further comprising the step of utilizing said plurality of entries in said stack register table to temporarily designate said first plurality of said plurality of physical registers as said stack.

22. The method according to claim 21, further comprising the steps of:
designating one of said plurality of fields within said special instruction register as a virtual stack field;
determining if each of said multiple instructions is a third type of instruction;
in response to a determination that said each of said multiple instructions is said third type of instruction, storing a first indicator in said virtual stack field; and
in response to a determination that said each of said multiple instructions is not said third type of instruction, storing a second indicator in said virtual stack field.

23. The method according to claim 22, further comprising the steps of:
for each of said special instruction registers, determining a type of indicator stored in said virtual stack field;
in response to a determination that said first indicator is stored in said virtual stack field, utilizing said one of said first plurality of said plurality of physical registers during execution of said one of said multiple instructions stored in said special instruction register; and
in response to a determination that said second indicator is stored in said virtual stack field, utilizing a storage location associated with said one of said multiple instructions during execution of said one of said multiple instructions stored in said special instruction register.

24. A superscalar data processing system for efficiently processing an instruction, said data processing system including multiple instructions to be processed during a single clock cycle, wherein said instruction is one of said multiple instructions, comprising:
means for determining if said instruction is a particular type of instruction which specifies data to be moved or copied during processing of said instruction from a logical origination location to a logical destination location; and
means responsive to a determination that said instruction is said particular type of instruction, for:
temporarily designating a first plurality of physical registers as a stack;
establishing a first pointer field associated with said instruction for associating a pointer stored in said first pointer field with said logical origination location;
associating a first pointer with said instruction, said first pointer identifying a physical location wherein said data is stored;
in response to a storage of said first pointer in said first pointer field, associating said logical origination location with said physical location;
establishing a second pointer field associated with said instruction for associating a pointer stored in said second pointer field with said logical destination location; and
processing said instruction by storing said first pointer in said second pointer field, whereby said logical destination location becomes associated with said physical location, wherein said data is not copied and remains in its original physical location during said processing of said instruction.

25. The system according to claim 24, further comprising means for establishing a second plurality of physical registers, wherein none of said second plurality of physical registers are initially designated as one of a plurality of general registers.

26. The system according to claim 25, further comprising means for associating said logical origination location with a first of said second plurality of physical registers.

27. The system according to claim 26, further comprising means for said data being stored in said first of said second plurality of physical registers.

28. The system according to claim 27, further comprising means for said data remaining in said first of said second plurality of physical registers and not being copied during said processing of said instruction.

29. The system according to claim 28, wherein said means for associating a first pointer with said instruction, said first pointer identifying a physical location wherein said data is stored further comprises means for associating a first pointer with said instruction, said first pointer identifying said first of said second plurality of physical register wherein said data is stored.

30. The system according to claim 29, further comprising means for said logical origination location being associated with one of said plurality of general registers.

31. The system according to claim 24, further comprising means for said logical destination location being associated with one of said first plurality of said plurality of physical registers temporarily designated as a stack.

32. The system according to claim 31, further comprising means for associating a second pointer with said instruction, said second pointer pointing to said logical destination location.

33. The system according to claim 32, further comprising:
means for each of said multiple instructions, for determining if said each of said multiple instructions is a second particular type of instruction;
means responsive to said each of said multiple instructions being said second particular type of instruction, for determining if said each of said multiple instructions is associated with at least one of a plurality of logical register names, wherein each of said plurality of logical register names identifies a different one of said plurality of general registers; and
means responsive to said each of said multiple instructions being associated with said at least one of said plurality of logical register names which identifies a particular one of said plurality of general registers, for temporarily designating one of said second plurality of physical registers as said particular one of said plurality of general registers, wherein said one of said second plurality of physical registers is temporarily utilized as said particular one of said plurality of general registers.

34. The system according to claim 33, further comprising:
means for establishing a different special instruction register for each of said multiple instructions; and
means for establishing a plurality of fields within said special instruction register.

35. The system according to claim 34, wherein said means for determining if said each of said multiple instructions is said second particular type of instruction further includes means for determining if said each of said multiple instructions is a load register instruction.

36. The system according to claim 35, further comprising means for each of said multiple instructions which is a load register instruction, for associating a different one of said second plurality of physical registers with said each of said multiple instructions which is a load register instruction.

37. The system according claim 36, further comprising:
means for establishing a physical register field in said special instruction register; and
means for storing an indication of said different one of said second plurality of physical registers associated with said each of said multiple instructions which is associated with said special instruction register in said physical register field.

38. The system according to claim 37, further comprising means for utilizing said stored indication of said different one of said second plurality of physical registers associated with said each of said multiple instructions which is associated with said special instruction register to temporarily designate said one of said second plurality of physical registers as said particular one of said plurality of general registers.

39. The system according to claim 38, further comprising:
means for designating one of said plurality of fields within said special instruction register as an allocation field;
means for determining if said each of said multiple instructions for which said special instruction register is established is a load register instruction;
means responsive to a determination that said each of said multiple instructions for which said special instruction register is established is a load register instruction, for storing a first indicator in said allocation field; and
means responsive to a determination that said each of said multiple instructions for which said special instruction register is established is not a load register instruction, for storing a second indicator in said allocation field.

40. The system according to claim 39, further comprising:
means for establishing a general register table;
means for establishing a plurality of fields within said general register table, each of said plurality of fields being associated with a different one of said plurality of logical register names, wherein each of said plurality of fields identifies a different one of said plurality of general registers; and
means for each said special instruction register including said first indicator stored in said allocation field, for storing said indication of said one of said second plurality of physical registers associated with said each of said multiple instructions which is associated with said special instruction register in said one of said plurality of fields within said general register table, wherein said one of said second plurality of physical registers is stored in said field is temporarily utilized as said one of said plurality of general registers identified by said one of said plurality of fields.

41. The system according to claim 40, further comprising means for associating a different logical stack register number with each of said first plurality of said plurality of physical registers to temporarily designate said first plurality of said plurality of physical registers as a stack.

42. The system according to claim 41, further comprising:
means for establishing a stack register table for storing a plurality of entries; and
means for each of said plurality of entries including an identification of a logical stack register number and an identification of one of said first plurality of said plurality of physical registers which is associated with said logical register number.

43. The system according to claim 42, further comprising:
means for each of said multiple instructions, for determining if said each of said multiple instructions is a third type of instruction which is associated with one of said logical stack register numbers;
means for establishing a physical register field and a logical stack register field in said special instruction register;
means responsive to said each of said multiple instructions being said third type of instruction, for storing said identification of said logical stack register number in said logical stack register field, and storing said identification of one of said first plurality of said plurality of physical registers which is associated with said logical register number in said physical register field.

44. The system according to claim 43, further comprising means for utilizing said plurality of entries in said stack register table to temporarily designate said first plurality of said plurality of physical registers as said stack.

45. The system according to claim 44, further comprising:
means for designating one of said plurality of fields within said special instruction register as a virtual stack field;
means for determining if each of said multiple instructions is a third type of instruction;
means responsive to a determination that said each of said multiple instructions is said third type of instruction, for storing a first indicator in said virtual stack field; and
means responsive to a determination that said each of said multiple instructions is not said third type of instruction, for storing a second indicator in said virtual stack field.

46. The system according to claim 45, further comprising:
means for each of said special instruction registers, for determining a type of indicator stored in said virtual stack field;
means responsive to a determination that said first indicator is stored in said virtual stack field, for utilizing said one of said first plurality of said plurality of physical registers during execution of said one of said multiple instructions stored in said special instruction register; and
means responsive to a determination that said second indicator is stored in said virtual stack field, for utilizing a storage location associated with said one of said multiple instructions during execution of said one of said multiple instructions stored in said special instruction register.

* * * * *